United States Patent

Kiss

[15] 3,659,479

[45] May 2, 1972

[54] POSITIVE CONTINUOUSLY CONSTANT GEAR-MESH SPEED CHANGE SYSTEM FOR PLANETARY DRIVE SYSTEMS AND THE LIKE

[72] Inventor: Laszlo J. Kiss, 7044 Paige, Warren, Mich. 48091

[22] Filed: Jan. 9, 1970

[21] Appl. No.: 1,823

[52] U.S. Cl. ................................... 74/681, 74/335, 74/339
[51] Int. Cl. ...................................... F16h 37/04, F16h 3/78
[58] Field of Search ......................... 74/335, 337.5, 339, 681

[56] References Cited

UNITED STATES PATENTS

| | | | |
|---|---|---|---|
| 2,593,416 | 4/1952 | Dawson | 74/339 |
| 2,740,509 | 4/1956 | Lecavelier | 74/335 X |
| 2,764,032 | 9/1956 | Leber | 74/339 |
| 3,306,128 | 2/1967 | Zuse | 74/679 |

FOREIGN PATENTS OR APPLICATIONS

| | | | |
|---|---|---|---|
| 544,335 | 4/1942 | Great Britain | 74/681 |

Primary Examiner—Carlton R. Croyle
Assistant Examiner—Thomas C. Perry
Attorney—Hauke, Gifford and Patalidis

[57] ABSTRACT

A planetary gear speed change system including a ratio alternater system and an automatic mechanical shifter system operable to shift ratio alternater elements into driving engagement with the planetary reaction member, vary its relative rotational value and then disengage, in automatic synchronous timed relation to the ratio alternater system functional cycles, with continuous drive during such shifting, to thereby vary the planetary driving ratios with continuous torque delivery throughout its operation, and including constant speed and/or fixed members synchronously engageable with the reaction member to maintain same at selected rotational values. Modifications include single, multiple and other combinations of planetary drive systems. Various novel synchronized shifter and ratio alternater systems are disclosed, as are novel combinations for effecting many varieties of driving conditions and speed change applications.

47 Claims, 61 Drawing Figures

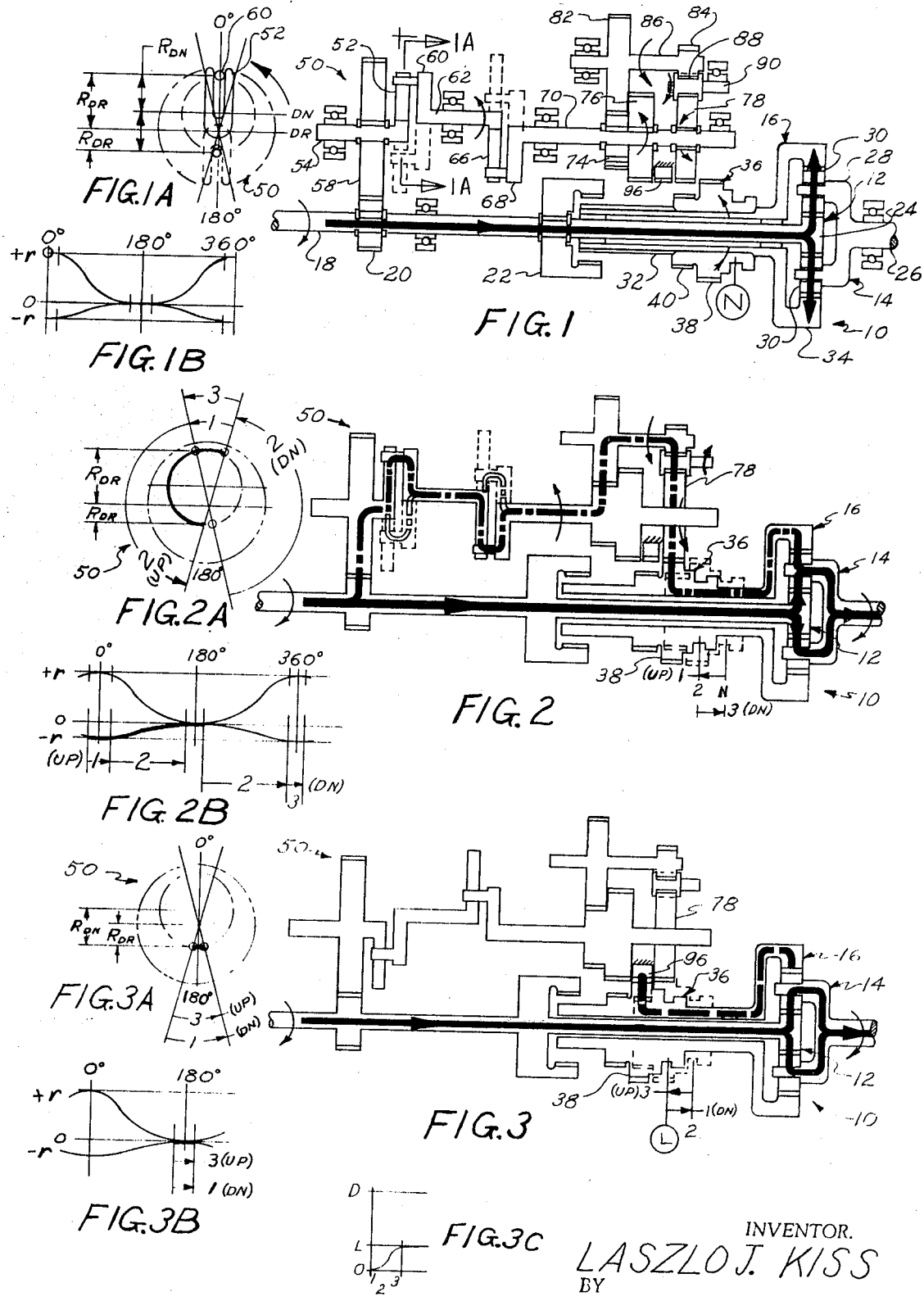

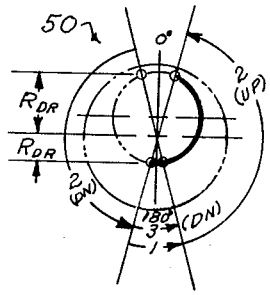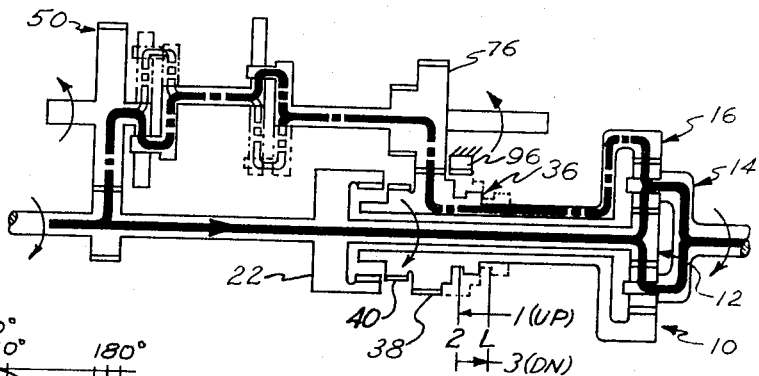
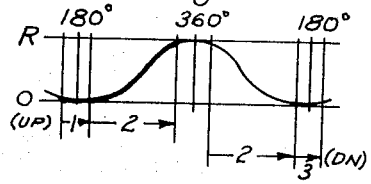
FIG. 4A
FIG. 4
FIG. 4B
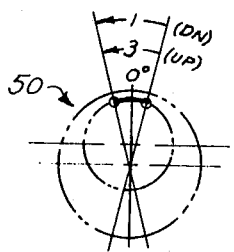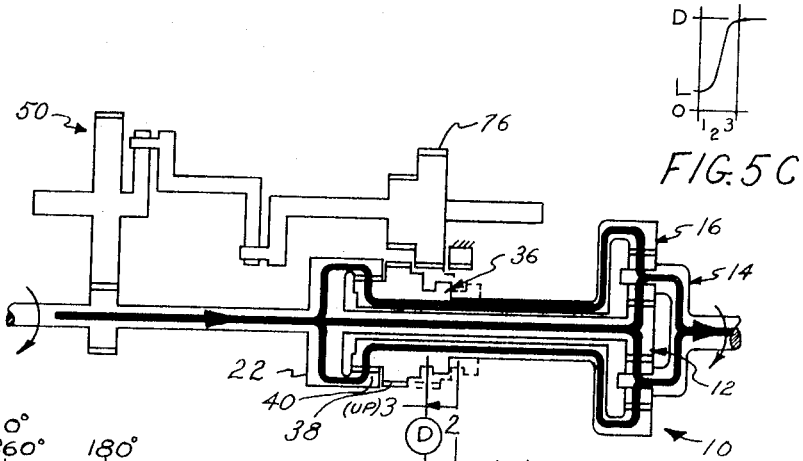
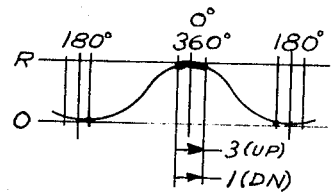
FIG. 5A
FIG. 5C
FIG. 5
FIG. 5B
INVENTOR.
LASZLO J. KISS
BY
Hauke, Gifford & Patalidis

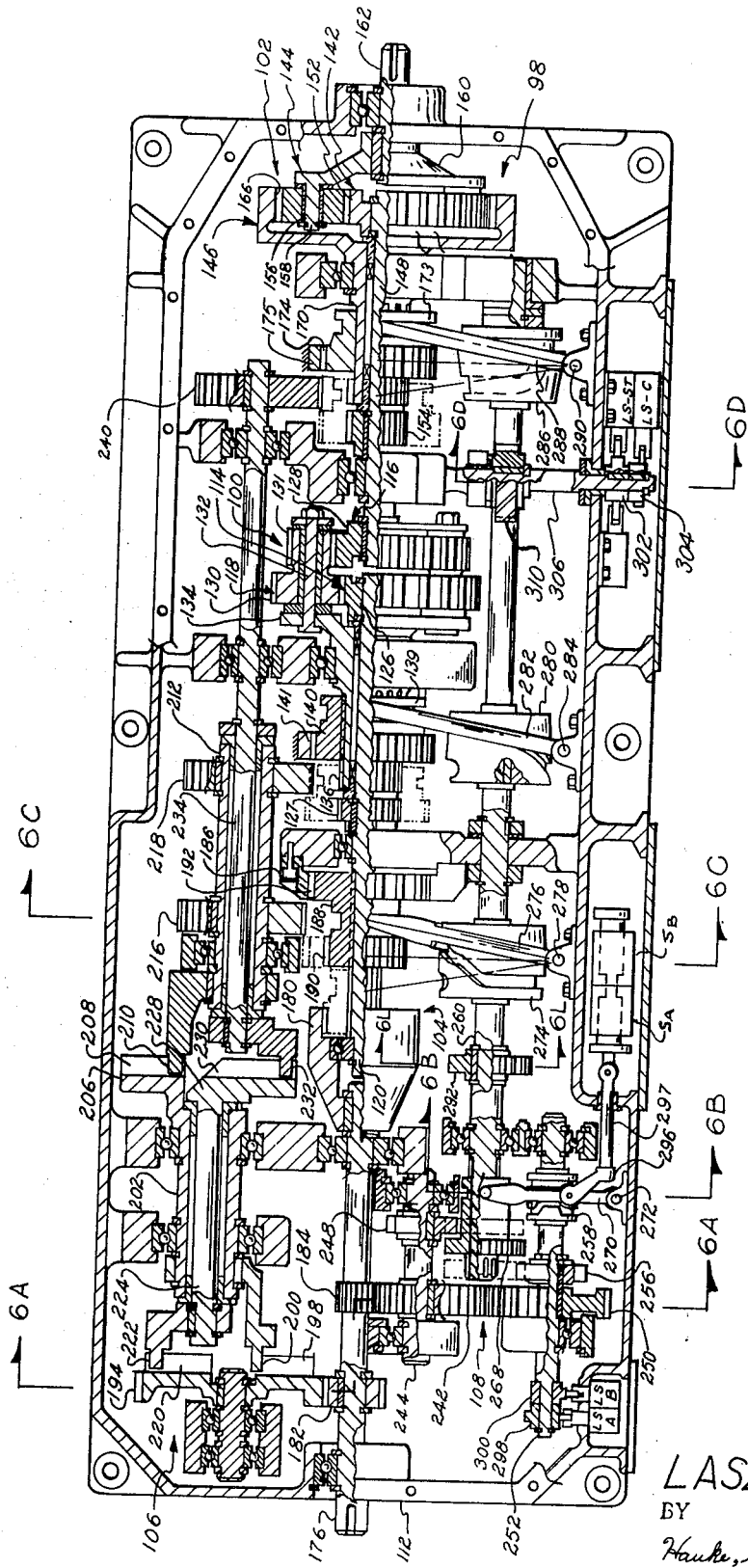

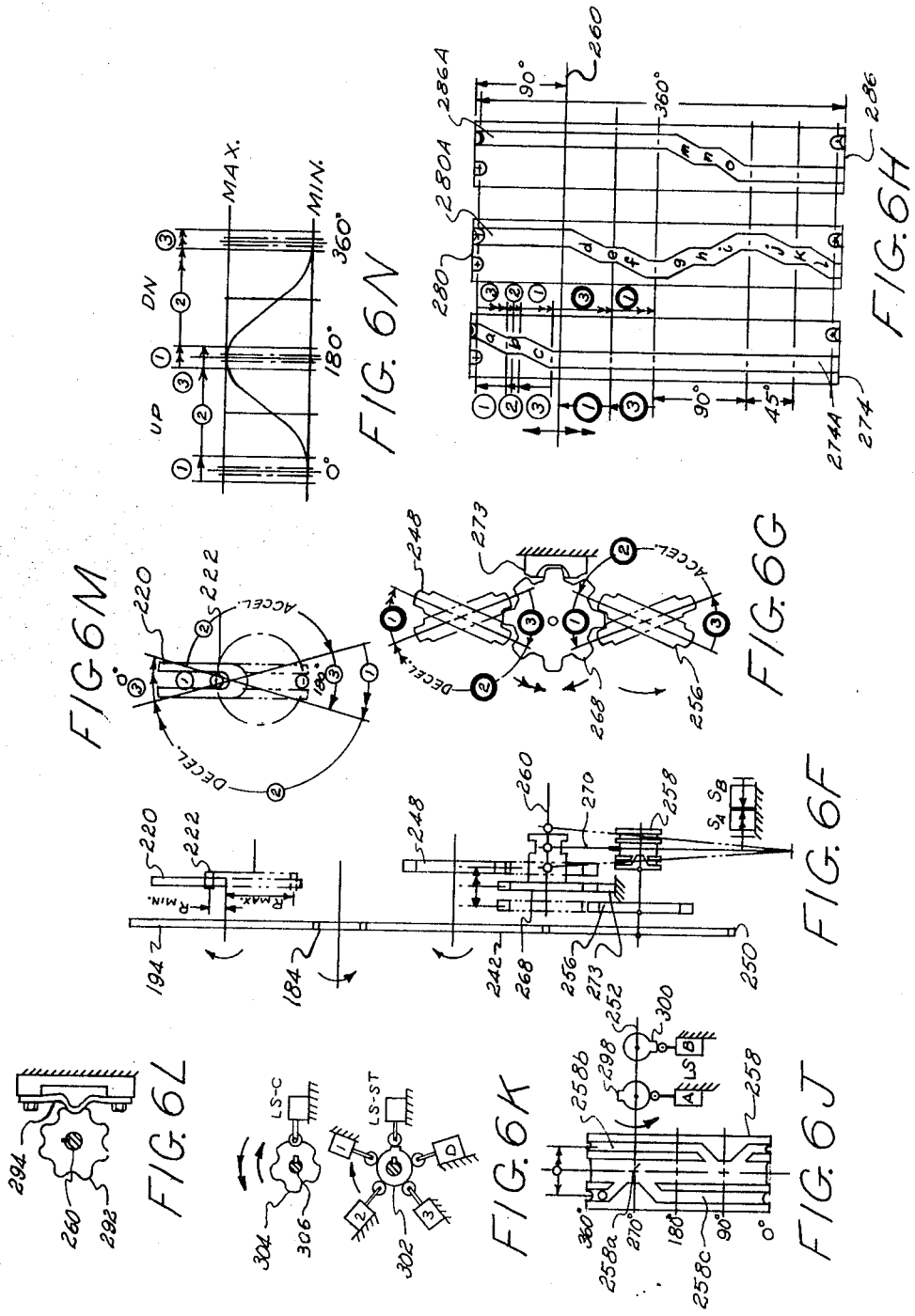

INVENTOR.
LASZLO J. KISS
BY
Hauke, Gifford & Patalidis

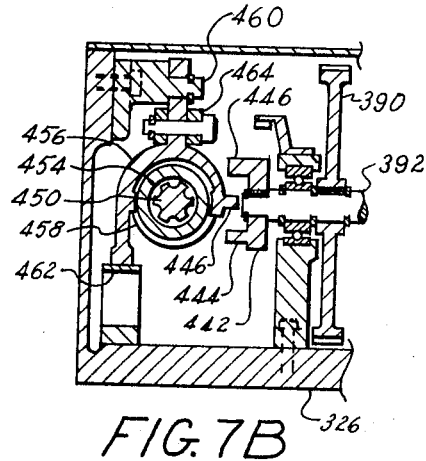
FIG. 7B
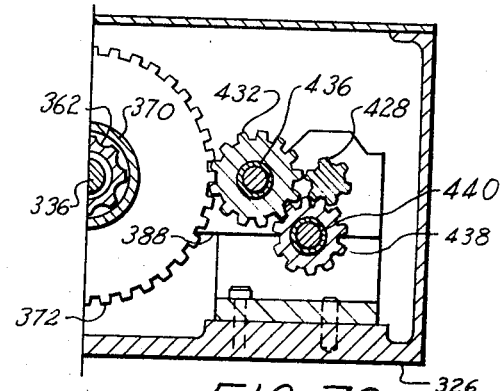
FIG. 7C
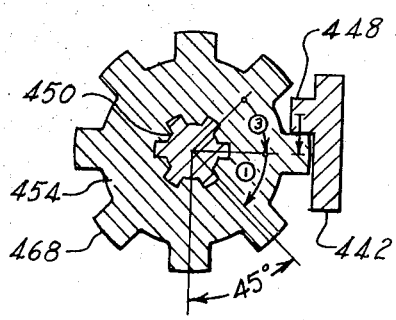
FIG. 7E
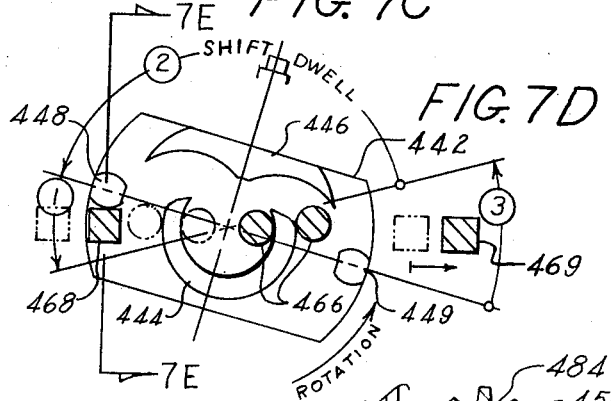
FIG. 7D
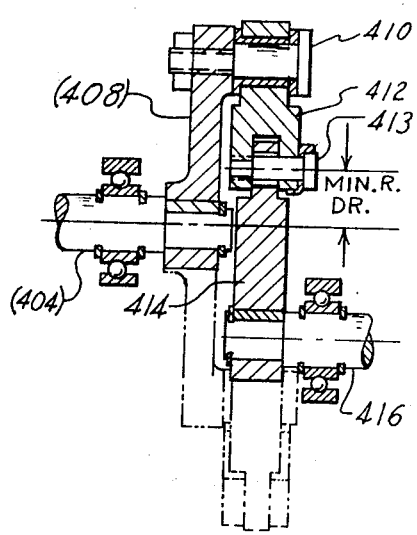
FIG. 7G
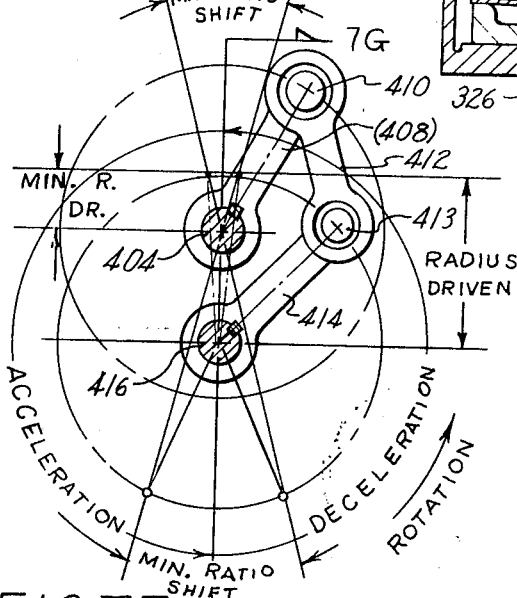
FIG. 7F
FIG. 7H
INVENTOR.
LASZLO J. KISS
BY
Hauke, Gifford & Patalidis

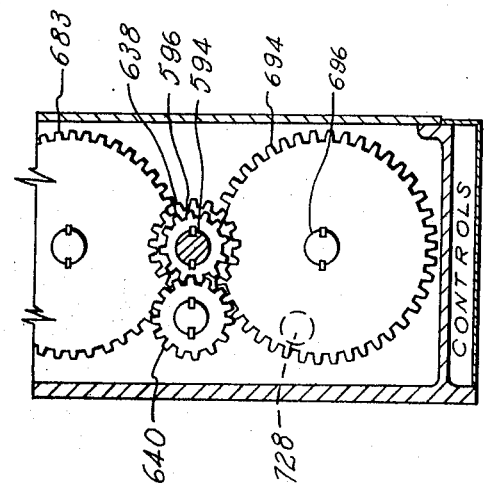
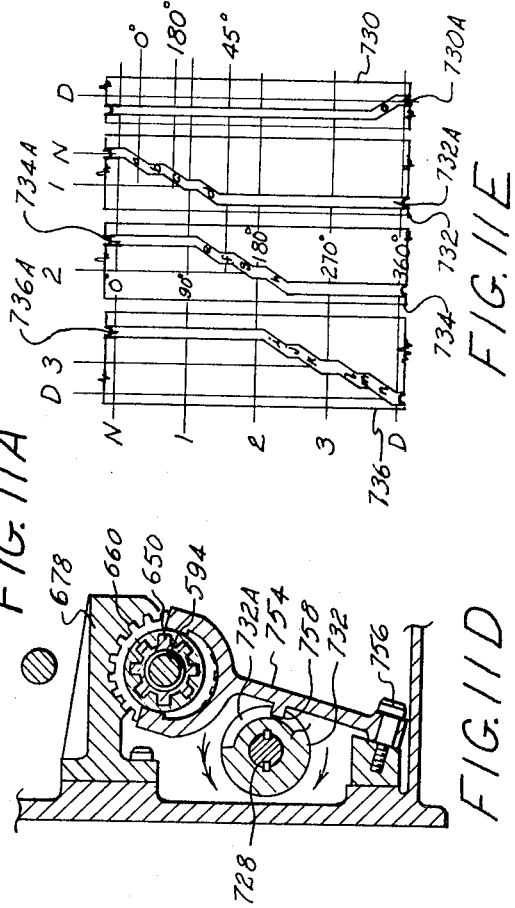
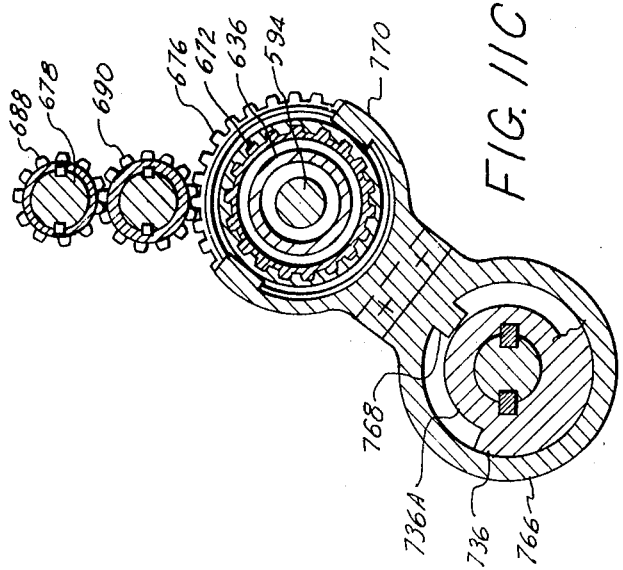
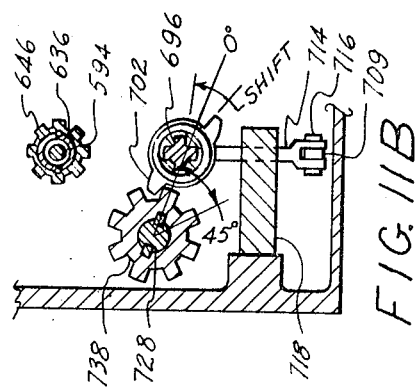

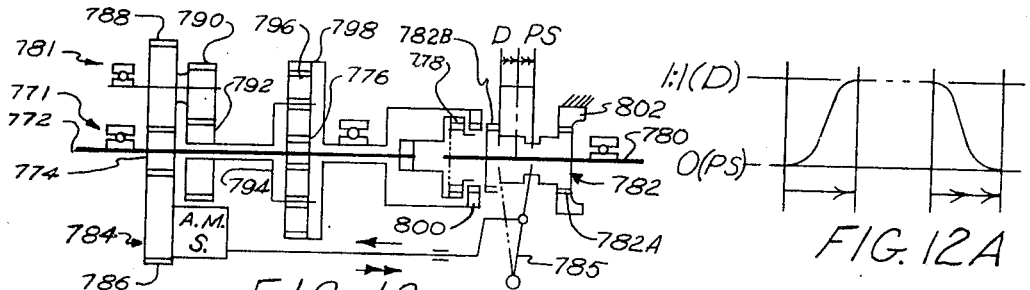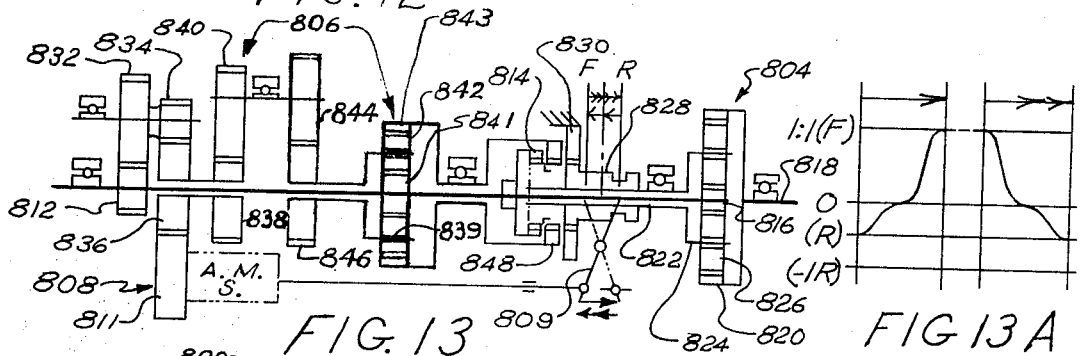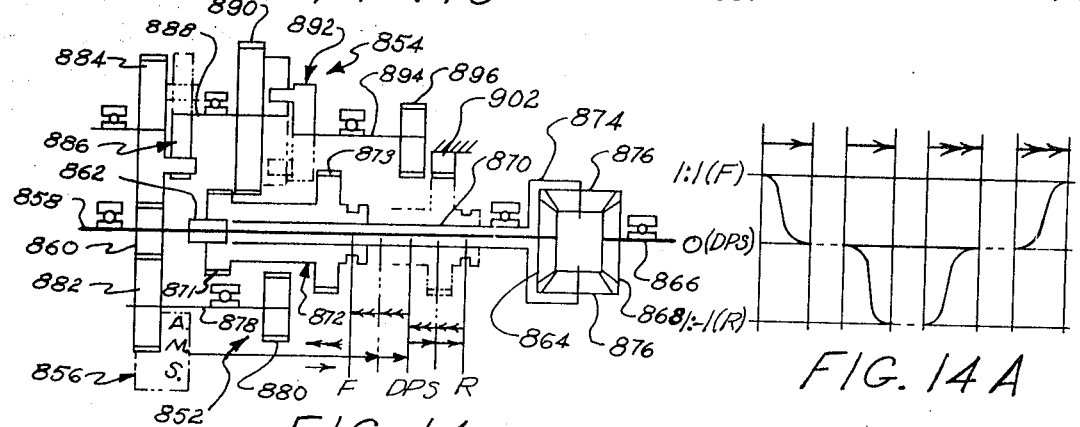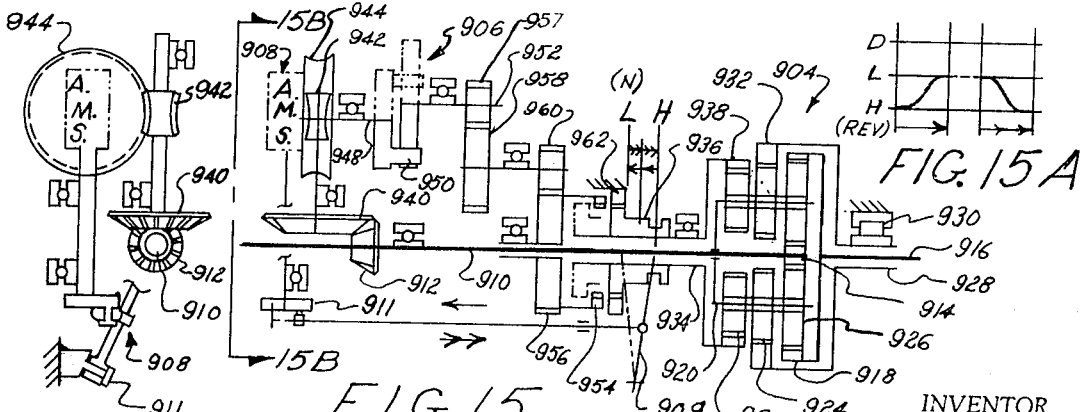

POSITIVE CONTINUOUSLY CONSTANT GEAR-MESH SPEED CHANGE SYSTEM FOR PLANETARY DRIVE SYSTEMS AND THE LIKE

BACKGROUND OF THE INVENTION

I. Field of the Invention

My invention relates to planetary drive systems and the like and more particularly to such systems having positive control over the rotation of their reaction members to achieve shifting between selective planetary speed ratios while transmitting continuous torque at all times.

II. Description of the Prior Art

Planetary and the like drive systems, which all have at least one set of input, output, and reaction members, reaction members generally also called fixed members, which members are commonly in the form of sun gear, planet carrier and ring gear (not necessarily in that order), conventionally incorporate a frictional element such as a brake or clutch operating on or with the reaction member to engage it in a fixed position or with its input shaft, to achieve variation of the planetary driving ratio, but in every case requiring one gear drive to be disengaged in order to engage another gear drive, thereby interrupting torque delivery. Many different results are obtained depending on which of the sun, planet or ring gears are used as the input, output or reaction members and depending on the type and combinations of planetaries used and their selected gear ratios. However, with conventional basic systems, one may only produce two controlled driving ratios with a single planetary system depending on whether the reaction member is fixed for low speed or clutched with the input for direct drive. Variations from a basic system require the addition of further planetary drives and further frictional brakes and/or clutches. I am aware of no prior art in the field which fulfills the long known need for planetary drive speed changes with constant gear-mesh shifting in the manner hereinafter disclosed.

SUMMARY OF THE INVENTION

In may U.S. Pat. No. 3,468,177, issued Sept. 23, 1969, I have described my invention of a novel continuous gear-mesh shifting transmission system, the heart of which is a unique ratio alternater and positive shifter system combination in which primary drive gears are synchronously shifted into and out of mesh with full width tooth engagement and without the use of any frictional elements, clutches, brakes or the like.

The present invention constitutes a new and unique extension of the principles of the aforesaid invention to all planetary and the like drive systems.

Basically, the reaction member of a planetary or the like drive system, whether it be a sun gear, planet gear carrier, or ring gear, is positively driven at any selected primary drive rotational value or is fixed, to thereby determine the driving ratios of the planetary input and output members, upon being first selectively synchronously shifted by an automatic mechanical shifter system into engagement with the alternately accelerating and decelerating driven element of a ratio alternater system, while being simultaneously disengaged from the primary drive system, so that it is accelerated or decelerated with constant gear mesh to the next primary drive rotational value. The reaction member is finally disconnected from the ratio alternater drive system and simultaneously connected with the primary drive system, all at automatically predetermined synchronous functional positions of the ratio alternater system operating cycles, resulting in the positive drive continuously constant gear-mesh speed change of the planetary system, with positive changes of input to output ratios, shifting with no loss or interruption of torque, and without using any frictional clutches, brakes or the like.

The reaction member is thus positively shifted to another selected primary drive rotational value, and is synchronously engaged, depending on such rotational value, with either a fixed member, a primary drive member rotated by the input member, or directly with the input member itself for direct drive, and maintained at that primary drive rotational value to effect a constant selected planetary input-to-output driving ratio. Alternatively, the reaction member may be synchronously completely disengaged to effect a neutral condition in which no driving force is transmitted to the output member. Further, the reaction member can be shifted to a primary drive rotational value which is the same as its neutral rotational value, which will effect a positively driven stopped condition of the output member, or it may be shifted to a primary drive rotational value to produce an output speed between its fixed low speed and direct drive or between its fixed low speed and zero output speed.

A planetary drive system embodying the present invention may utilize selective shifting of the reaction member with a series of different ratio primary drive elements to effect a complete series of any required number of planetary driving ratios. Further, a simplified reverser coupling device operable on the planetary input member enables a planetary system to be positively shifted through a different series of selected drive ratios from fixed reaction member effected output speed to direct drive and also from fixed reaction member effected output speed to zero output.

At any time that the output member is positively driven to a zero rotational value, it can be synchronously shifted into engagement with a fixed member to effect a positive stopped condition.

Additional planetary drive systems may be combined to achieve innumerable varieties of driving ratios and conditions, but it will be found that more speed variations are possible with fewer planetary drives when utilizing the present speed change system than when conventional clutches, brakes and the like are used.

It will be noted that a planetary drive system may have more than one reaction member to control the output speed, in which case while one remains permanently fixed, the other can be used for shifting in accordance with my present invention to effect the fixed reactional output speed, neutral, or any other constant speed which may be required.

Also, it will be noted that with my invention all shiftings are achieved with continuously constant gear mesh, thereby effecting substantially constant accelerations and decelerations, producing no sudden shocks while changing speeds.

Further, it will be noted that with my present invention all shiftings are accomplished through the use of a unique automatic mechanical shifter system having preset shifting functions relative to the functions of the ratio alternater system such that the shiftings are effected with a unique constant mechanical shifting cycle related to predetermined constant input shaft revolutions to produce constant output revolutions while shifting. Whenever mechanical shifting cycles are repeated, they will always be absolutely the same in revolution and also in "shift time." Therefore, the drive systems incorporating my present invention are applicable to even the most demanding shift accuracy requirements of automatic or semi-automatic drive systems for transmitting different rotations or motions. Shifting controls may be manual or semi-automatic, or may incorporate fully-automatic punched card or magnetic tape controls or the like.

Thus, any conceivable desired drive result is possible with a planetary drive system incorporating the present invention, in all cases providing for continuous torque delivery even during the shifting functions, with accurate shifting cycles, producing useful applications for practically all types of industrial machinery and vehicles as well as in heavy duty applications, where speed changing is desired with or without positive stops.

DESCRIPTION OF THE DRAWINGS

For a more complete understanding of the present invention, reference may be had to the accompanying drawings illustrating some preferred embodiments of the invention in which like reference characters refer to like parts throughout the several views and in which:

FIG. 1 is a diagrammatic longitudinal view illustrating the basic concept of the present invention, showing a preferred basic planetary system in a neutral position;

FIG. 1A is a diagrammatic cross section of the ratio alternater of FIG. 1 taken substantially on the line 1A—1A thereof, illustrating its functioning principle;

FIG. 1B is a relative ratio alternater curve for the ratio alternater functions of FIG. 1A;

FIG. 2 is a diagrammatic longitudinal view illustrating the system of FIG. 1 while shifting between neutral and low speed positions;

FIG. 2A is a diagram illustrating the FIG. 2 ratio alternater function;

FIG. 2B is a relative ratio alternater curve for the ratio alternater function of FIG. 2A;

FIG. 3 is a diagrammatic longitudinal view illustrating the system of FIG. 1 in its low speed position;

FIG. 3A is a diagram illustrating the FIG. 3 ratio alternater function;

FIG. 3B is a relative ratio alternater curve for the ratio alternater function of FIG. 3A;

FIG. 3C is an output speed curve of the system of FIG. 1 between its neutral and low speed operations;

FIG. 4 is a diagrammatic longitudinal view illustrating the system of FIG. 1 while shifting between low and direct drive positions;

FIG. 4A is a diagram illustrating the FIG. 4 ratio alternater function;

FIG. 4B is a relative ratio alternater curve for the ratio alternater function of FIG. 4A;

FIG. 5 is a diagrammatic longitudinal view illustrating the system of FIG. 1 in its direct drive position;

FIG. 5A is a diagram illustrating the FIG. 5 ratio alternating function;

FIG. 5B is a relative ratio alternater curve for the ratio alternater function of FIG. 5A;

FIG. 5C is an output speed curve of the system of FIG. 1 between its low speed and direct drive operations;

FIG. 6 is a longitudinal partly cross-sectional plan view of a preferred dual planetary transmission drive having four speeds in combination with a geared positive clutch, wherein all drives incorporate the principles disclosed in FIGS. 1–5 and its associated diagrams;

FIG. 6F is a diagrammatic view illustrating the functions of the ratio alternater, shifter and shift start systems shown in FIG. 6;

FIG. 6G is a diagrammatic view illustrating the functions of the shift driver and driven elements as seen from the right side of FIG. 6F;

FIG. 6H is a diagrammatic development of the shifter drums of FIG. 6 in relation to the functions of FIG. 6G;

FIG. 6J is a diagrammatic development of the shift cycle start cam drum of FIG. 6;

FIG. 6K is a diagrammatic view of the control system limit switches of FIGS. 6 and 6E;

FIG. 6L is a fragmentary cross-sectional view taken substantially on the line 6L—6L of FIG. 6;

FIG. 6M is a diagrammatic view illustrating the functions of the ratio alternaters as seen from the right side of FIG. 6F;

FIG. 6N is a relative ratio curve for the ratio alternaters of FIG. 6;

FIG. 7B is a fragmentary cross-sectional view taken substantially on the line 7B—7B of FIG. 7;

FIG. 7C is a fragmentary cross-sectional view taken substantially on the line 7C—7C of FIG. 7;

FIG. 7D is a cross-sectional view taken substantially on the line 7D—7D of FIG. 7;

FIG. 7E is a cross-sectional view taken substantially on the line 7E—7E of FIG. 7D;

FIG. 7F is a cross-sectional view taken substantially on the line 7F—7F of FIG. 7 and illustrating the functioning principle of a link-type ratio alternater;

FIG. 7G is a cross-sectional view taken substantially on the line 7G—7G of FIG. 7F;

FIG. 7H is a fragmentary cross-sectional view taken substantially on the line 7H—7H of FIG. 7A;

FIG. 11A is a fragmentary cross-sectional view as seen substantially from the line 11A—11A of FIG. 11;

FIG. 11B is a fragmentary cross-sectional view taken substantially on the line 11B—11B of FIG. 11;

FIG. 11C is a cross-sectional view taken substantially on the line 11C—11C of FIG. 11;

FIG. 11D is a fragmentary cross-sectional view taken substantially on the line 11D—11D of FIG. 11;

FIG. 11E is a diagrammatic development of the shifter drums of FIG. 11;

FIG. 12 is a diagrammatic longitudinal view of a preferred planetary ratio alternater for drive systems of the geared positive clutch type for positive stop and direct drive embodying my invention;

FIG. 12A is a relative speed curve for the system of FIG. 12;

FIG. 13 is a diagrammatic longitudinal view of a preferred planetary forward-reverse drive system embodying my invention;

FIG. 13A is a relative speed curve for the system of FIG. 13;

FIG. 14 is a diagrammatic longitudinal view of a preferred bevel planetary drive system, with forward, driven positive stop and reverse drive embodying my invention;

FIG. 14A is a relative speed curve for the system of FIG. 14;

FIG. 15 is a diagrammatic longitudinal view of a preferred two speed high ratio reduction triple planetary drive system having two reaction members, one of which is controlled by a one-way clutch, embodying my invention;

FIG. 15A is an output speed curve for the system of FIG. 15; and

FIG. 15B is an input end view of the system of FIG. 15 as seen substantially from the line 15B—15B thereof.

DESCRIPTION OF THE PREFERRED EMBODIMENTS

A. Basic Concept, FIGS. 1–5

1. Primary Drive System 10

Figure 6E:
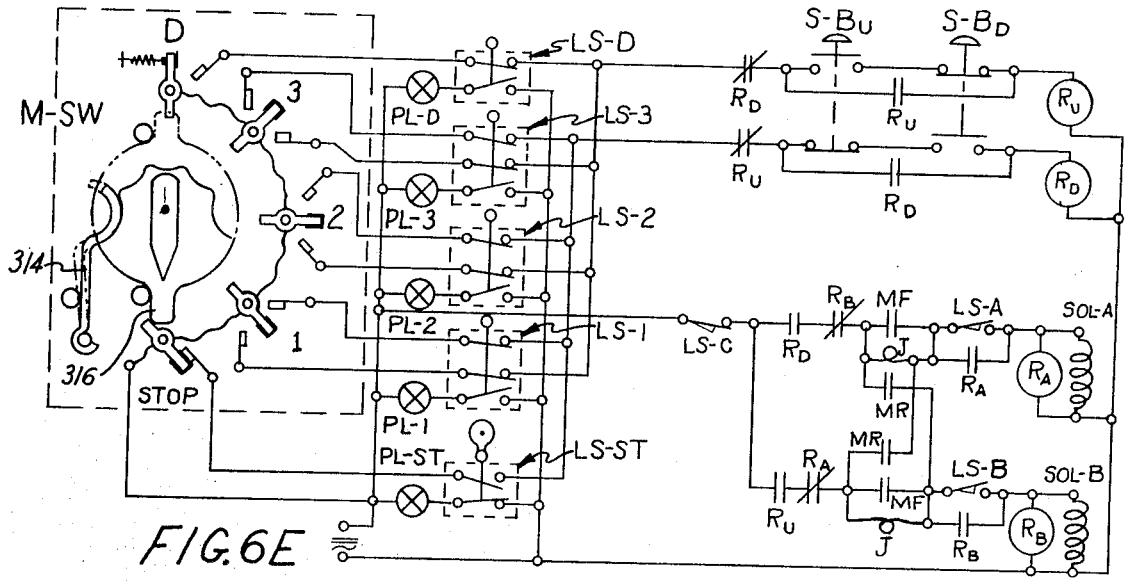
FIG. 6E is an electrical schematic of the control system of FIG. 6.
Figure 6C:
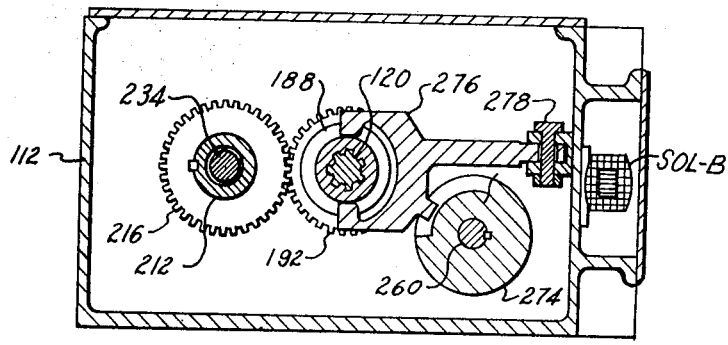
FIG. 6C is a cross-sectional view taken substantially on the line 6C—6C of FIG. 6.
Figure 6D:
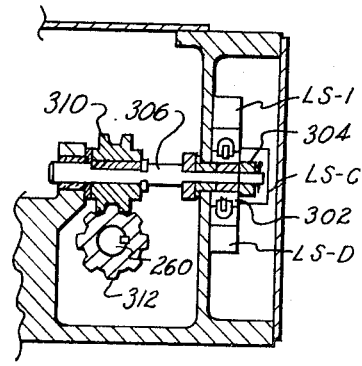
FIG. 6D is a fragmentary cross-sectional view taken substantially on the line 6D—6D of FIG. 6.

Note: In the following specification the term "primary drive system" refers to a drive train or trains which produce a constant output speed or input-to-output drive ratio.

The primary drive system 10 comprises a planetary drive unit including an input member 12, an output member 14 and a reaction member 16.

For illustrative purposes only: the input member 12 includes a sun gear 24 fixed for rotation with an input shaft 18 having also fixed thereto a drive gear 20, and an interiorly splined direct drive coupling driver element 22; the output member 14 includes a planet carrier 28 fixed to an output shaft 26 and rotatably carrying a plurality of planet gears 30 in constant mesh with the sun gear 24; and the reaction member 16 includes a ring gear 34 fixed to an exteriorly splined reaction shaft 32 and constantly meshed with the planet gears 30, with an internally splined shifter cone member 36 rotatable with and axially shiftable on the reaction shaft 32. The shifter cone member 36 includes a driven gear 38 and a direct drive coupling driven element 40, the latter being selectively engageable with the aforementioned coupling driver element 22. The reaction shaft 32 is rotatably concentrically bearing supported on the input shaft 18.

2. Shifter System

An automatic mechanical shifter system (not shown) is arranged to synchronously axially shift the shifter cone member 36 on the reaction shaft 32 to and from the selected constant speed positions shown in FIGS. 1, 3 and 5. FIGS. 2 and 4 illustrate the intermediate or dwell positions, as will be more fully described hereafter. As shown in FIG. 1, the primary drive system 10 is in its neutral N position, the output member 14 being in idle or stopped, not receiving rotational power because the clockwise rotating input member 12, as viewed toward the right, drives the freely rotating reaction member 16 counterclockwise at a predetermined rotational value depending on the planetary ratio. The primary driving power is indicated by the solid directional flow line.

3. Ratio Alternater Drive System 50

A ratio alternater drive system 50 is illustrated as preferably comprising a first driver element 52 rotating with a first driver shaft 54 continuously rotated in a counterclockwise direction, at a predetermined ratio relative to the input shaft 18, by the drive gear 20 through a driven gear 58 fixed to the first driver shaft 54. The first driver element 52 preferably consists of a substantially radial slotted arm, as shown in FIG. 1A, rotating on the driver axis "DR" and operable to rotate a first driven element 60 which consists of a radial crank engaged in the slot of the first driver element 52 and fixed to a second driver shaft 62 rotatable on a driven axis "DN" which is offset from the driver axis "DR" as indicated in FIG. 1A. Thus, as the first driver element 52 is rotated continuously by the planetary input shaft 18, the first driven element 60 alternately accelerates and decelerates between two predetermined relative speeds; that is, at the 0° position of FIG. 1A, the first driven element 60 is being rotated at its highest speed relative to the first driver element 52, and at the 180° position, the first driven element 60 is being rotated at its lowest speed relative to the first driver element 52, because of the continuously alternating relative driver and driven radii ratios. Note that the slotted arm driving radius varies substantially infinitely between the two R radii indicated in FIG. 1A while the crank radius R is constant.

A second driver element 66, again preferably of the slotted arm type, rotates with the second driver shaft 62 and extends oppositely to the first driven element 60. A second driven element 68, again preferably of the crank type, is fixed to a ratio alternater output shaft 70 rotatably bearing supported on an axis offset from the axis of the second driver shaft 62. The second driven element 68 will, in the manner previously described for the first driven element 60, be rotated between two predetermined speeds relative to the second driver element 66 due to the continuously alternating second relative driver and driven radii ratios.

The higher and lower relative speeds of first and second the driven elements 60 and 68 are cumulative because their minimum and maximum ratio positions occur simultaneously in the system shown, such that the effect of the ratio alternater as a whole is to produce alternating infinitely varying effective driving ratios between selected minimum and maximum ratio values, the maximum in this case being sufficiently high such that, at the 180° position of FIG. 1A the ratio alternater output shaft 70 will be driven at a substantially zero rotational value. In further modifications to be described, and in some modifications illustrated in my aforementioned U.S. Pat. No. 3,468,177, systems may be incorporated which will drive the ratio alternater output shaft to an absolutely zero rotational value, or to any other desired ratio values.

Affixed to and rotatable with the ratio alternater output shaft 70 are a reversing gear 74 and a ratio alternater low-direct driver gear 76. A ratio alternater reverse driver gear 78 is rotatably bearing supported on the output shaft 70. Reversing gears 82 and 84 affixed to a rotatable shaft 86 and an idler gear 88 affixed to a rotatable bearing supported shaft 90 drivingly connect the reversing gear 74 with the reverse driver gear 78.

A fixed gear-toothed element 96 is disposed intermediate the ratio alternater driver gear 76 and 78 as indicated, such that these three elements are located for selective successive driving engagement with the reaction member driven gear 38 as the shifter cone member 36 is axially shifted on the reaction shaft 32 by the automatic mechanical shifter system in synchronous relation with the selected maximum and minimum ratio value functions of the ratio alternater system.

4. Operation

The functions of the ratio alternater and shifter systems are illustrated in FIG. 1A, as hereinbefore described, and FIG. 1B, which illustrates these functions in speed curve form. The negative "−r" speed curve indicates the reverse rotational values of the counterclockwise rotating ratio alternater reverse driver gear 78 relative to the clockwise rotating planetary input member 12, being termed "negative" because, when the reverse driver gear 78 is drivingly engaged with the driven gear 38, the reaction member 16 will be driven reversely to the input member 12 (the direction of the reaction gear rotation when driven at neutral) to and from a zero rotational value. At the 0° or 360° ratio alternater position, this negative value is the reaction member rotational value when the output member 14 is at idle or stopped, with the ratio alternater system functioning at its minimum ratio value.

Throughout the following description, it must be borne in mind that although FIGS. 1A, 2A, 3A, 4A and 5A illustrate the rotational functions of only the first mentioned slotted arm-to-crank portion of the ratio alternater, the speed curves of FIGS. 1B, 2B, 3B, 4B and 5B illustrate the alternating ratio functions of the ratio alternater as a whole; that is, the variations produced on the ratio alternater output shaft 70 and the gearing driven thereby. Also, note that the terms (up) and (DN) in the drawings refer to shifting actions respectively toward higher and lower output speeds of the planetary system, while the numbers "1," "2" and "3" refer respectively to the first, second and third shift functional actions of the shifter cone member 36, arcs through which the ratio alternater arm and crank components rotate during such shift movements, and the portions of the speed curves functionally related thereto.

The speed curve, for a predetermined angular rotation before and after the 0° position of the ratio alternater, has substantially no variation, as indicated in FIG. 2B, so that shifting of the shifter cone member 36 from the FIG. 1 neutral "N" position to the FIG. 2 position may occur as the reverse driver gear 78 drives the driven gear 38 in reverse direction at substantially synchronous maximum rotational velocity, the ratio alternater crank and slotted arm components at such time functioning through that arc designated "1" in FIG. 2A, which is substantially the minimum ratio value of the ratio alternater.

As the ratio alternater system continues to rotate from the 0° toward the 180° position, designated as the arc "2 (UP)" in FIG. 2A and the decelerating curve portion "2 (UP)" of FIG. 2B, it operates to decelerate the reverse or counterclockwise rotating reaction member 16 toward a substantially zero rotational value, termed herein the second shift action or the "dwell" shifting period.

Driving power or torque from the input member 12 immediately upon engagement of the driver and driven gears 78 and 38, is transmitted directly to the output member 14 as the planet carrier 28 is positively accelerated by the slowing of the reverse rotation of the reaction member ring gear 34, thereby imparting thrust, as indicated by the solid primary drive power flow line of FIG. 2, and as indicated by the dot-dash ratio alternater power flow line.

As the ratio alternater system rotates toward the 180° position, the reaction member ring gear is decelerated to a substantially zero rotational value, effecting an increasing planetary output speed. Again, during a predetermined angular rotation before and after the 180° position, the speed curve has substantially no variation, such that the next shifting action can occur as designated "3 (UP)" in FIG. 3A, and in that portion of the ratio alternater output speed curve indicated at "3 (UP)" in FIG. 3B while the reaction member 16 is driven to a substantially zero rotational value. During this shift period, the automatic mechanical shifter system will function to shift the shifter cone member 36 to the left as designated "3 (UP)" in FIG. 3 to synchronously mesh the driven gear 38 with the fixed element 96 while substantially simultaneously disengaging the driver and driven gears 78 and 38. The planetary output member 14 is now being continuously driven at low "L" speed position of FIG. 3. FIG. 3C illustrates the output speed curve in shifting from the neutral "N" or zero output to the low speed "L" output.

Whenever it is desired, at a time when the ratio alternater drive system 50 is functioning again at its maximum ratio value and the low-direct driver gear 76 is rotating at substantially zero value, a further upward speed automatic shift cycle may be initiated. During a predetermined angular rotation before and after the 180° position illustrated by the arc "1" in FIG. 4B indicating the ratio alternater zero rotational output value, the low-direct driver gear 76 is substantially synchronized with the stopped driven gear 38 which can during this period be shifted to the left into engagement with the driver gear 76 while substantially simultaneously being disengaged from the fixed element 96 during the first shaft action.

During the second shift action or shift dwell, as the ratio alternater drive system 50 now functions toward its minimum ratio value, the reaction member 16 will be accelerated in a clockwise direction during that portion of the ratio alternater arc designated "2 (UP)" in FIG. 4A, the ratio curve of FIG. 4B rising through that portion designated "2 (UP)" at the substantially non-varying curve portion before and after the 360° position, the reaction member coupling driven element 40 is positively driven to become substantially synchronized with the input member coupling driver element 22, and at such time the automatic mechanical shifter system will function to shift the shifter cone member 36 to the left, positively engaging the coupling driver and driven elements 22 and 40 while substantially simultaneously disengaging the driver and driven gears 76 and 38 during that period when the ratio alternater elements are rotating through that arc of FIG. 5A designated "3" in FIG. 5A, completing the third shift action. The input and reaction members 12 and 16 are thus coupled together in the direct drive "D" position of FIG. 5. The output speed curve from low "L" to direct drive "D" positions is illustrated in FIG. 5C.

Shifting from direct drive "D" downward to low "L" and then to neutral "N" will be accomplished in similar fashion, the similar but substantially opposite shifting cycles being synchronized with the substantially opposite functions of the ratio alternater drive system 50, the steps of operation for each shift cycle being designated by the appropriate numerals and directional arrows (DN) of FIGS. 1-5, 1A-5A, 1B-5B, 3C and 5C.

The diameters of the various driver, driven, and associated gear elements, and the ratio alternater minimum and maximum ratio values, will be selected to effect those synchronized speeds for shifting which are determined by the type and operating characteristics of the planetary gearing to achieve the foregoing operative functions. At all times, the reaction member 16 is fully and positively controlled, the shifting gear elements having full total gear-mesh width during the described shifts to effect positive continuous driving speed changes with full and uninterrupted torque delivery.

The basic principle of positive constant gear-mesh shifting shown and described for FIGS. 1-5 and the associated diagrams applies to all types and styles of planetary systems to obtain desired ratio variations with positive continuous driving speed change, and in all cases while the ratio alternater system is drivingly engaged to positively drive the reaction member it alternates its rotation from one output speed to another while it is being shifted.

B. Four-Speed Dual Planetary and Geared Positive Clutch Transmission

FIG. 6 and its associated cross sections, details and diagrams illustrate the construction of a complete representative planetary drive transmission incorporating an application of the positive continuous driving speed change system of the invention, and comprises a primary drive system 98 having first and second planetaries 100 and 102 respectively arranged in series, and a geared positive clutch system 104. The speed change system comprises a parallel dual ratio alternater drive system 106 operably engageable with components of the primary drive systems as synchronously effected by an automatic mechanical positive shifter system 108. These systems are contained in and supported by a transmission housing 112.

1. Primary Drive System — First Planetary 100

The preferred first planetary 100 basically comprises a first input member 114, a first output member 116, and a first reaction member 118.

The first input member 114 includes a first input sun gear 126 fixed for rotation with a partially splined first input shaft 120 rotatably bearing supported by the housing 112 and having a first direct drive element 127 affixed at an intermediate location as shown.

The first output member 116 comprises a first output sun gear 128 carried by the forward end of a second input shaft 148 to be described with the second planetary 102.

The first reaction member 118 comprises a first planet carrier 134 having dual first planet gears 130 and 131 rotatably carried on first planet shafts 132 secured to the first planet carrier 134 which is constructed integrally with an externally splined first reaction shaft 136 rotatably bearing supported by the housing 112 and on the first input shaft 120. An internally splined first planetary shifter cone 139 having a driven gear 140 rotates with and is axially slideable on the first reaction shaft 136, but in the position shown the driven gear 140 is engaged with a first planetary fixed member 141.

The dual first planet gears 130 and 131 are constantly meshed respectively with the first input and output sun gears 126 and 128 to produce selected first planetary driving ratios determined by the rotational value of the first reaction member 118, which is variable upon shifting of the first planetary shifter cone 139, synchronously with the functions of the ratio alternater drive system 106, between a stopped position in which the driven gear 140 is engaged with the fixed member 141 for a low speed and a direct drive position in which the internal splines of the first shifter cone 139 mesh with the external teeth of the first direct drive element 127.

2. Primary Drive System — Second Planetary 102

The preferred second planetary 102 basically comprises a second input member 142, a second output member 144, and a second reaction member 146.

The second input member 142 comprises a second sun gear 152 fixed for rotation with the second input shaft 148 rotatably bearing supported by the housing 112 with the first output sun gear 128 fixed to its forward end as previously described, and a second direct drive element 154 affixed at an intermediate location as shown.

The second output member 144 comprises a second planet carrier 160 having second planet gears 156 constantly meshed with the second sun gear 152 and rotatable on second planet shafts 158 secured to the second planet carrier 160 which is fixed to a transmission output shaft 162 rotatably bearing supported by the housing 112.

The second reaction member 146 comprises an internal ring gear 166 rotatably bearing supported in the housing and integrally constructed with an externally splined second reaction shaft 170 rotatably bearing supported on the second input shaft 148 and by the housing 112. An internally splined second planetary shifter cone 173 having a driven gear 174 rotates with and is axially slideable on the second reaction shaft 170, but in the low speed position shown the driven gear 174 is engaged with a second planetary fixed member 175.

The ring gear 166 is constantly meshed with the second planet gears 156 to produce selected second planetary driving ratios determined by the rotational value of the second reaction member 146, which is variable upon shifting of the second planetary shifter cone 173, synchronously with the functions of the ratio alternater drive system 106, between a fixed position in which the driven gear 174 is engaged with the fixed member 175 for low speed and a direct drive position in which the internal splines of the second planetary shifter cone 173 engage the second direct drive element 154.

3. Geared Positive Clutch System 104

The preferred geared positive clutch system 104 comprises a transmission input shaft 176 rotatably bearing supported by the housing 112, with an internally toothed positive clutch driver member 180 on its rear end rotatably bearing supporting the forward end of the planetary first input shaft 120, which serves as the output shaft of the geared positive clutch system 104. A ratio alternater system drive gear 182 and a shifter system drive gear 184 are affixed to intermediate locations of the transmission input shaft 176 as shown.

An internally toothed fixed stop member 186 is mounted in the housing 112. An internally splined clutch shifter cone 188, having integrally constructed therewith a positive clutch driven member 190 and a positive stop driven gear 192, is rotatable with and axially slideable on the splined portion of the planetary first input shaft 120.

The clutch shifter cone 188 is selectively shiftable, synchronously with the functions of the ratio alternater drive system 106, between a positive stopped position in which the positive stop driven gear 192 is engaged with the fixed stop member 186 and a direct drive or positive clutched position in which the positive clutch driven member 190 is engaged with the positive clutch driver member 180. In the stopped position, with the transmission input shaft 176 rotating, no power is delivered to the planetary systems and the transmission output shaft 162 will be positively stopped, while in the positive clutched position direct drive is delivered to the planetary systems.

4. Parallel Dual Ratio Alternater Drive System 106

The preferred dual ratio alternater drive system incorporated in the FIG. 6 embodiment of the invention includes a driven gear 194 rotatably bearing supported by the housing 112 and in constant gear mesh with the input shaft mounted drive gear 182 at a predetermined ratio. A first ratio alternater initial driver element 198 consists of a slotted fork integral with the driven gear 194. A first ratio alternater initial driven element 200 consists of a crank engaged in the slot of the driver element 198 and fixed to a tubular first ratio alternater initial shaft 202 rotatably bearing supported by the housing 112 on an axis offset from the axis of the driven gear 194 so that the crank of the driven element 200, having a fixed radius, will be driven by the driver element 198, which has a varying radius contact through its slot, to continuously alternately accelerate and decelerate the driven element 200 between selected first maximum and minimum ratio values.

A slotted fork 206 integral with the rear end of the shaft 202 forms a first ratio alternater final driver element 208. A first ratio alternater final driven element 210 consists of a crank engaged in the slot of the driver element 208 and fixed to a tubular first ratio alternater driven shaft 212 rotatably bearing supported by the housing 112 on an axis offset from the axis of the shaft 202 so that the crank of the driven element 210, having a fixed radius, will be driven by the driver element 208, which has a varying radius contact through its slot, to continuously accelerate and decelerate the driven element 210 between selected first final maximum and minimum ratio values.

A ratio alternater positive clutch driver gear 216 and first reaction driver gear 218 are fixed to rotate with the driven shaft 212. The minimum and maximum ratio values above described are cumulative in effect to positively constantly alternate the driver gears 216 and 218 between a first planetary direct drive velocity and substantially zero rotational values.

A second ratio alternater initial driver element 220 consists of a second slotted fork integral with the driven gear 194 and located substantially 180° relative to the first initial driver element 198. A second ratio alternater initial driven element 222 consists of a crank engaged in the slot of the driver element 220 and fixed to a second ratio alternater initial shaft 224 rotatably bearing supported within the tubular shaft 202 so that the crank of the driven element 222, having a fixed radius, will be driven by the driver element 220, which has a varying radius contact through its slot, to continuously alternately accelerate and decelerate the driven element 22 between selected first maximum and minimum ratio values.

A slotted fork 228 integral with the rear end of the shaft 224 has a radial slot forming a second ratio alternater final driver element 230. A second ratio alternater final driven element 232 consists of a crank engaged in the slot of the driver element 230 and fixed to a second ratio alternater driven shaft 234 rotatably bearing supported within the tubular shaft 212 and by the housing 112 so that the crank of the driven element 232, having a fixed radius, will be driven by the driver element 230, which has a varying radius contact through its slot, to continuously alternately accelerate and decelerate the driven element 232 between selected second final maximum and minimum ratio values.

A ratio alternater second reaction driver gear 240 is fixed to rotate with the rear end of the driven shaft 234 as shown. The minimum and the maximum ratio values above described are cumulative in effect to positively constantly alternate the driver gear 240 between a second planetary direct drive velocity and substantially zero rotational values. The second final maximum and minimum ratio values described occur 180° out of phase with respect to the first final maximum and minimum ratio values previously described, as will be apparent from the relative positioning of the respective ratio alternater driver and driven elements shown in the drawings.

5. Automatic Mechanical Positive Shifter System 108

Figure 6A:
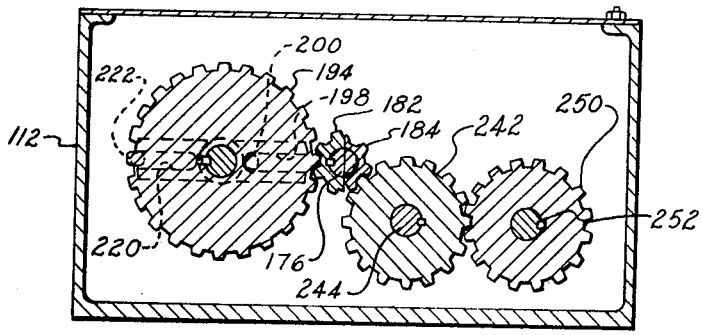
FIG. 6A is a cross-sectional view taken substantially on the line 6A—6A of FIG. 6.

The preferred automatic mechanical positive shifter system 108 comprises a first shift driver gear 242 constantly meshed, as illustrated in FIGS. 6 and 6A, with the shifter system drive gear 184 fixed for rotation with the transmission input shaft 176 and having the same ratio with the driver gear 242 as the ratio alternater driven gear 194 has with its drive gear 182. The first shift driver gear 242 is fixed to a first shifter shaft 244 rotatably bearing supported by the housing 112. An up shift driver element 248 is affixed to the shaft 244 as shown.

A second shift driver gear 250 constantly meshed at a one to one ratio with the first shift driver gear 242 is fixed to a second shifter shaft 252 rotatably bearing supported by the housing 112. A down shift driver element 256 and a shift cycle start drum 258 are affixed to the shaft 252 as shown.

Figure 6B:
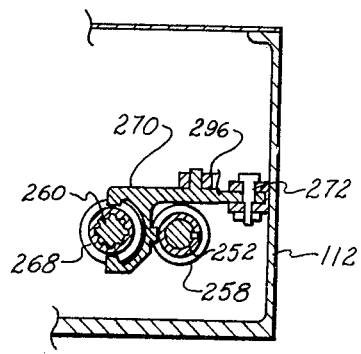
FIG. 6B is a fragmentary cross-sectional view taken substantially on the line 6B—6B of FIG. 6.

A shifter drive shaft 260 is rotatably bearing supported by the housing 112 and, as shown in FIGS. 6 and 6B, a shift cycler element 268 is internally splined for rotation with and axial shifting on the shaft 260, being operably connected for shifting purposes with the shift cycle start drum 258 by a shift cycle start fork 270 pivotally mounted to the housing 112 on a pin 272.

A plan development of the shift cycle start drum 258 is shown in FIG. 6J. With the drum 258 rotating clockwise, as seen from the left side of FIG. 6, the fork 270 in its neutral position will be engaged in a central groove 258a of the drum 258. Upon synchronized urging of the fork 270 toward either the right or the left, it will, at either the 90° or 270° annular point, be cammed into either a right or a left side groove 258b or 258c, enabling the fork 270 to shift the shift cycler element 268 into position to be engaged respectively with either the up shift or the down shift driver element 248 or 256 as indicated in FIG. 6F. After a nearly 360° rotation of the shift cycle start drum 258, the fork 270 will be cammed back to the neutral position, engaging the shift cycler element 268 with a housing mounted fixed element 273 seen in FIGS. 6F and 6G, and substantially simultaneously disengaging the shift cycler element 268 from the respective driver element 248 or 256.

As seen in FIG. 6G, the shift cycler element 268 has eight 45° separated teeth, while the up shift and down shift driver elements 248 and 256 each have two 180° separated teeth. Thus, on each 360° rotation of a shift driver element, in line with which the shift cycler element 268 has been shifted by the fork 270, the shift cycler element 268 will be rotatably indexed first to effect a first shift action designated (1), then a second shift action non-rotating dwell designated (2), and then a third shift action designated (3), in positive relationship with the ratio alternaters, for the shifting functions hereinafter described.

A clutch shifter drum 274 is fixed for rotation with the shift driver shaft 260 and operably connected with the splined clutch shifter cone 188 by means of a clutch shifter fork 276 pivotally carried on a housing mounted pin 278 so that, starting from the position of FIG. 6, a counterclockwise shift action (1) cycled rotation of the clutch shifter drum 274 will first synchronously shift the positive stop driven gear 192 out of engagement with the stop member 186 and simultaneously into mesh with the clutch driver gear 216, then following a shift action dwell (2) the shift action (3) will disengage them while synchronously shifting the clutch driven member 190 into mesh with the clutch driver member 180, functionally synchronously with the ratio alternater first final maximum and minimum ratio values.

A first planetary shifter drum 280 is similarly fixed for rotation with the shifter drive shaft 260 and operably connected with the first planetary shifter cone 139 by means of a fist planetary shifter fork 282 pivotally carried on a housing mounted pin 284 so that, starting from the first low speed position of FIG. 6, a counterclockwise shift action (1) cycled rotation of the shifter drum 280 will first shift the shifter cone 139 to mesh its driven gear 140 with the first reaction driver gear 218 while disengaging from the fixed member 141, then following a shift action dwell (2) the shift action (3) will synchronously shift the shifter cone 139 to mesh its internal splines with the first direct drive element 127, functioning synchronously with the ratio alternater first final maximum and minimum ratio values.

A second planetary shifter drum 286 is similarly fixed for rotation with the shifter drive shaft 260 and operably connected with the second planetary shifter cone 173 by means of a second planetary shifter fork 288 pivotally carried on a housing mounted pin 290 so that, starting from the position of FIG. 6, a counterclockwise shift action (1) cycled rotation of the shifter drum 286 will first shift the shifter cone 173 to mesh its driven gear 174 with the second reaction driver gear 240 while disengaging from the fixed member 175, then following a shift action dwell (2) a shift action (3) will synchronously shift the shifter cone 173 to mesh its internal splines with the second direct drive element 154, functioning synchronously with the ratio alternater second final maximum and minimum ratio values.

As can be seen, each complete shifting cycle consists of three steps; namely a first shift action (1), a second shift action dwell (2) during which acceleration or deceleration occurs, and a third shift action (3), all as previously described for FIGS. 1–5. A multiply detented shaft locator 292 shown in FIG. 6L, having a detent for each 45° shift position, is fixed for rotation with the shifter drive shaft 260 and is engageable with a housing mounted shaft locater spring 294 to locate the rotational positions of the shaft 260 at each stopped position. In the particular arrangement shown, some of the shift actions of the planetary shifter drums will occur simultaneously, as will be described hereafter, so that a total of eight shaft 260 positions are required, two for each complete shift cycle, corresponding with the eight indexed positions of the shift cycler element 268 previously described.

Plan developments of the shifter drums 274, 280 and 286, with the connecting shifter drive shaft 260 indicated, are illustrated in FIG. 6H to indicate their operational relationships with the shift positions of the shift cycler element 268 of FIG. 6G. Assuming sequential shifts of the shift cycler element 268 when shifted into the plane of the up shift driver element 248 which is rotating in a clockwise direction, a first predetermined incremental counterclockwise rotation of the drums produced thereby will effect a first shift action (1) of the clutch shifter fork 276, as it is cammed by a sloped portion "a" of a cam groove 274A of the drum 274, to shift the positive stop driven gear 192 out of engagement with the fixed stop member 186 and simultaneously into mesh with the ratio alternater positive clutch driver gear 216 during the predetermined angular rotation from before to after the 0° position of the first ratio alternater, substantially at its maximum ratio value. The positive stop driven gear 192 is then accelerated while the fork is engaged at a dwell stop portion "b" of the cam groove 274A, during the dwell action designated (2) in FIG. 6G, following which the clutch shifter drum 274 is rotated another predetermined increment to effect a third shift action (3) of the clutch shifter fork 276, as it is cammed by a sloped portion "c" of the cam groove 274A, to shift the driven gear 192 out of engagement with the positive clutch driver gear 216 while substantially engaging the positive clutch driver and driven members 180 and 190 during the predetermined angular rotation before to after the 180° position of the first ratio alternater, substantially at its minimum ratio value. The planetary drives will now be operating in the low or first speed position since the planetary shifter forks 282 and 288 are engaged in the right side annular portions of cam grooves 280A and 286A respectively of the planetary shifter drums 280 and 286, and have not been actuated by the first shift cycle rotation.

The next predetermined incremental rotation effects a first shift action (1) of the first planetary shifter fork 282 toward the left, as it is cammed by a sloped portion "d" of the cam groove 280A, shifting the first planetary shifter cone driven gear 140 out of engagement with the fixed member 141 and into mesh with the ratio alternater first reaction driver gear 218 while the first ratio alternater is substantially at its maximum ratio value. During a second shift action dwell (2), with the shifter fork 282 engaged in a dwell stop portion "e" of the cam groove 280A, the driven gear 140 is accelerated, and then the next predetermined incremental rotation of the shifter drum 280 effects a third shift action (3) of the shifter fork 282, as it is cammed by a sloped portion "f" of the cam groove 280A toward the extreme left position, shifting the shifter cone driven gear 140 to the left to disengage it from the driver gear 218 while substantially simultaneously meshing the internal splines with the first direct drive element 127, coupling the first and second input shafts 120 and 148 for direct drive while the first ratio alternater is substantially at its minimum ratio value. The planetary systems will now be operating in the second speed position because the second planetary gearing is still in its low speed position.

The next incremental rotation effects a simultaneous first shift action (1) of the first planetary shifter fork 282, as it is cammed by a sloped groove portion "g" of the cam groove 280A back toward the right, and of the second planetary shifter fork 288, as it is cammed by a sloped portion "*m*" of the cam groove 286A toward the left, thereby shifting the splines of the first planetary shifter cone 139 out of mesh with the direct drive element 127 and meshing the driven gear 140 with the driver gear 218, while shifting the driven gear 174 out of engagement with the fixed member 175 and into mesh with the ratio alternater second reaction driver gear 240 at that rotational period when the first ratio alternater is functioning substantially at its minimum ratio value and the second ratio alternater is functioning substantially at its maximum ratio value.

During a second shift action dwell (2), with the shifter forks 282 and 288 respectively engaged in cam groove portions "*h*" and "*n*," the first planetary shifter cone 139 is decelerated while the second planetary shifter cone 173 is accelerated, following which the next incremental rotation effects a simultaneous third shift action (3) of the shifter fork 282, as it is cammed by a sloped groove portion "*i*" of the cam groove 280A toward the right, and of the shifter fork 288, as it is cammed by a sloped groove portion "*o*" of the cam groove 286A toward the left, thereby shifting the driven gear 140 out of mesh with the driver gear 218 and into engagement with the fixed member 141 for low speed, while shifting the driven gear 174 out of mesh with the driver gear 240 and the internal splines of the shifter cone 173 into mesh with the second direct drive element 154 during that rotational period at which the first ratio alternater is functioning substantially at its maximum ratio value and the second ratio alternater is functioning substantially at its minimum ratio value. The transmission system will now be operating in the third speed position which is the first planetary low and the second planetary direct drive.

Finally, a next incremental rotation effects a first shift action (1) of the first planetary shifter fork 282, as it is cammed by a sloped groove portion "*j*" of the cam groove 280A again toward the left, shifting the driven gear 140 again into mesh with the driver gear 218 while simultaneously disengaging from the fixed member 141, when the first ratio alternater is at its maximum ratio value. During a second shift action dwell (2), the fork 282 is engaged in a groove portion "*k*" of the cam groove 280A, and the shifter cone 139 is again accelerated, after which a third shift action (3), camming the fork 282 by a sloped groove portion "*1*" of the cam groove 280A, shifts the internal splines of the shifter cone 139 into mesh with the direct drive element 127 when the first ratio alternater is at its minimum ratio value. The transmission system will now be operating in the fourth speed or direct drive position.

If at any time the shift cycler element 268 is shifted to the left for predetermined incremental rotations by the down shift driver element 256 which is rotating counterclockwise, the clockwise rotations of the shifter drums 274, 280 and 286 will effect first, second and third shift actions in the reverse of those previously described, shifting the planetary systems back through third and second, to first and finally to declutched positive stop positions. Each complete shift cycle, whether to lower "DN" or higher "UP" speed positions, is initiated by a shift of the shift cycler element 268 from its neutral to either right or left by its shift cycle start fork 270.

As seen in FIG. 6, a control arm 296 operatively connects the shift cycle start fork 270 with a pair of solenoids A and B either of which is selectively energized by shift cycle start limit switches LS-A and LS-B actuated by cams 298 and 300 rotatable with the second shifter shaft 252 shown in FIGS. 6 and 6J. Upon selective energization of either up or down shift electrical circuits, the shifting is automatically controlled by actuation of limit switches LS-ST, LS-1, LS-2, LS-3 and LS-D engaged by a cam 302, and by actuation of limit switch LS-C engaged by a cam 304, shown in FIG. 6K. As seen in FIGS. 6 and 6D, the cams 302 and 304 are fixed for rotation with a shaft 306 bearing supported by the housing 112 and having a helical driven gear 310 fixed to be driven by a helical driver gear 312 fixed on the shifter drive shaft 260 in a gear ratio to translate the four 90° complete shift cycles into five stop positions.

FIG. 6E is the electrical control diagram for the automatic mechanical positive shifter system 108. As shown, a manual selector switch M-SW having a switch actuating lug 316 and detents engageable by a positioning spring 314, is suitably mounted on any convenient instrument panel (not shown). A series of lug-actuated switches designated STOP, 1, 2, 3 and D refer to the transmission speed positions; namely stop, first speed, second speed, third speed and direct drive, the switches being spring loaded to neutral or open positions and actuated to engage their respective contacts as the switch M-SW is rotated to make the appropriate contacts.

For example, in the position shown in FIG. 6E, switches 1, 2, 3 and D are open, and although switch STOP is closed, the cam 302 is actuating the normally closed contact of the limit switch LS-ST to off, disconnecting the down shift "D" circuit, while it normally open contact turns a panel indicator light PL-ST on indicating that the prior selection shifting to stop is completed. Limit switch LS-C is closed to provide current to the two solenoid circuits, but the relays $R_U$ (up) and $R_D$ (down) are de-energized so that their memory contacts are open and their normally closed contacts $R_D$ and $R_U$ are closed, holding both circuits in readiness for the next shift selection. Thus, although limit switches LS-A and LS-B are alternately closed at each 180° rotation of the shift cycle shaft 252, the solenoids A and B remain de-energized until either the manual start button S-$B_U$ (up) or S-$B_D$ (down) is actuated.

Now if the selector switch M-SW is turned counterclockwise to a higher position, for example to engage switch 1 with its lower contact, current through the normally closed contact of the limit switch LS-1 will energize relay $R_U$ when the start-up switch S-$B_U$ is depressed, to close the memory contacts $R_U$ for holding this circuit closed, to open the normally closed contacts $R_U$ to de-energize the $R_D$ relay circuit, and to close the $R_U$ contact in the SOL-B solenoid circuit so that, when the limit switch LS-B is actuated by the cam 300, the $R_B$ relay and SOL-B solenoid are energized. Energizing the $R_B$ relay closes the $R_B$ memory contact to hold this circuit closed and opens the normally closed $R_B$ contacts in the SOL-A solenoid circuit to keep it de-energized. When energized, the solenoid SOL-B pushes the shift cycle start fork 270 to the left to start the complete mechanical shift cycle, during the operation of which the cam 304 will open the normally closed contact of LS-C limit switch to de-energize the complete electrical control circuits. During the completion of the shifting action, the cam 302 will actuate the LS-1 limit switch to de-energize that selected circuit and turn on the pilot light PL-1. Turning the selector switch M-SW to other higher speed positions will similarly energize the SOL-B solenoid to start further complete mechanical shift cycles in substantially the same fashion. Conversely, turning the selector switch M-SW clockwise from higher to lower speed positions will energize similar control circuits to the SOL-A solenoid to initiate complete mechanical down shift cycles after selective actuation of the start button S-$B_D$.

With a reversible drive motor (not shown) driving the transmission, the motor auxiliary "forward" MF and "reverse" MR contacts of the respective motor starters will be connected, thereby reversing functions of the controls and of the shift cycling members for counterclockwise input shaft drive so that the shifting functions of the shifter drums explained heretofore remain the same. If a reversing motor is not used, the jumper wires J are used for clockwise input rotation.

It will be seen that other control system circuitry can be adapted to the present constant gear-mesh shift transmission to suit any control requirements, and can readily be adapted to punch card or tape control systems and the like, which will be apparent to one skilled in the art.

It is important to note, however, that the primary drive system, the ratio alternater system, and the automatic mechanical shifter system including its control system operating cam components, are all positively gear driven from or operably connected with the same transmission input shaft 176, so that the cycles of all systems function automatically and in constant relationship without the possibility of becoming misadjusted.

It will also be noted that in the system of FIG. 6, two ratio alternater drive systems are used for the purpose of providing opposite functions to the planetaries while one is decelerated and the other is accelerated during substantially the same shifting cycle, but if each planetary is to be shifted individually during separate shifting cycles, then only one ratio alternater drive system will be required.

In the system of FIG. 6, the planetary reaction members are shifted between direct drive and fixed positions regardless of their planetary gear ratios. Also, it will be apparent that additional planetaries may be readily incorporated in this system for additional speeds using the same ratio alternaters and shift drive system.

C. Four Speed Single Planetary System

Figure 7:
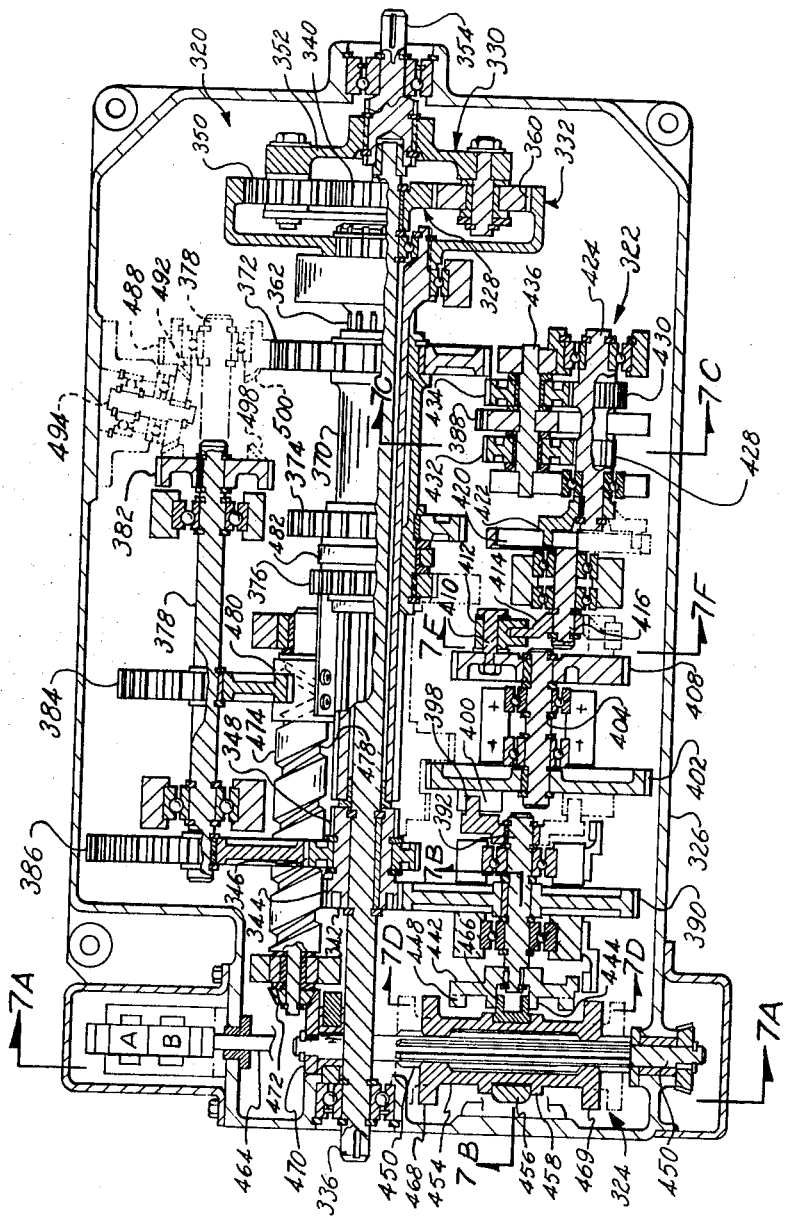
FIG. 7 is a longitudinal partly cross-sectional plan view of a preferred four speed single planetary drive transmission with a driven positive stop alternative.

FIG. 7 and its associated cross-sections and details illustrate the construction of another complete positive continuously constant gear-mesh drive speed change planetary transmission system, having a primary drive system 320 with one planetary gearing, a ratio alternater drive system 322 and an automatic mechanical shifter system 324, all contained in and supported by a transmission housing 326.

1. Primary Drive System 320

The primary drive system 320 basically comprises one planetary gearing having an input member 328, an output member 330, and a reaction member 332 selectively shiftable with constant gear-mesh shift to be driven at relatively fixed speeds by primary driver gears to be described.

The input member 328 includes an input sun gear 340 fixed for rotation with an input shaft 336 rotatably bearing supported by the housing 326, with a drive element 342 fixed at an intermediate position, the drive element 342 having a speed change system driver gear 344 and a direct drive spline element 348 integral therewith, and a primary drive gear 346 affixed thereto.

The output member 330 comprises a planet carrier 352 having a plurality of planet gears 350 in constant mesh with the input sun gear 340, the planet carrier 352 being secured to and fixed for rotation with an output shaft 354 which is bearing supported for rotation on the rear end of the input shaft 336 and by the housing 326.

The reaction member 332 comprises a ring gear 360 constantly meshed with the planet gears 350 and fixed to a tubular externally splined reaction shaft 362 rotatably bearing supported on the input shaft 336 and by the housing 326. An internally splined sleeve shaft 370 is rotatable with and axially shiftable on the reaction shaft 362, with a neutral-first-second speed driven gear 372, a third speed driven gear 374, and a third-direct driven gear 376 fixed to the sleeve shaft 370 as shown. The planetary drive gear ratios are determined by the relative positive rotational values of the reaction member ring gear 360 relative to the rotational value of the input member 328, as they are in all planetary drive systems.

A primary shaft 378 rotatably bearing supported in the housing 326 has fixed thereto a second speed primary driver gear 382, a third speed primary driver gear 384, and a constant drive gear 386 as shown, the drive gear 386 being in constant mesh with the primary drive gear 346 which is continuously rotated by the input shaft 336 at a predetermined ratio relative thereto. A housing mounted fixed element 388 is also provided as shown in FIGS. 7 and 7C.

The rotational value of the reaction member 332 is varied upon shifting of the splined sleeve shaft 370, synchronously with the functions of the ratio alternater drive system 322, between the neutral position shown in FIG. 7, in which the output shaft 354 is stopped or at idle and the entire reaction member 332 rotates free, to a fixed position in which the neutral-first-second speed driven gear 372 is engaged with the fixed element 388 to effect first or low speed rotation of the output shaft 354, then to a second speed position in which the same driven gear 372 is meshed with the second speed primary driver gear 382 to effect a second speed rotation of the output shaft 354, then to a third speed position in which the third speed driven gear 374 is meshed with the third speed primary driver gear 384 to effect a third speed rotation of the output shaft 354, and finally to a direct drive position in which the internal splines of the sleeve shaft 370 mesh with the direct drive spline element 348 to effect a direct drive of the input shaft 336 with reaction member 322 and hence with the output member 330.

2. Ratio Alternater Drive System 322

The ratio alternater drive system 322 comprises one single and one double ratio alternater connected in series and including a driven gear 390 in constant mesh with the speed change system driver gear 344 rotated by the input shaft 336 at a predetermined ratio with respect thereto and fixed to a first ratio alternater input shaft 392 rotatably bearing supported by the housing 326.

A first ratio alternater driver element crank 398 is fixed to the input shaft 392 and is drivingly engaged in a first ratio alternater driven element slot 400 formed integrally with a third-direct speed driver gear 402 fixed to a first ratio alternater output shaft 404. The shaft 404 is rotatably bearing supported by the housing 326 on an axis disposed at a predetermined offset from the input shaft 392, and a second-third speed driver gear 408 is fixed to this shaft 404.

The driver gear 408 also is constructed to form a second ratio alternater first driver element crank 410 pivotally connected by a link 412 which is pivotally connected as at 413 to a second ratio alternater first driven element crank 414 fixed for rotation with a second ratio alternater intermediate shaft 416 bearing supported by the housing 326 on an axis disposed at a predetermined offset from the axis of the first ratio alternater output shaft 404. This type of crank-link-crank ratio alternater is illustrated in more detail in FIGS. 7F and 7G. It will be seen that in such an arrangement, when the driver crank 410 is at a maximum radial distance from the shaft axis of the driven crank 414, the driven crank pivot point 413 is at a minimum radial distance from the shaft axis of the driver crank 410, at which time the ratio alternater is functioning at its maximum drive ratio. Following a 180° rotation, when the driver crank 410 is at a minimum radial distance from the shaft axis of the driven crank 414, the driven crank pivot point 413 is at a maximum radial distance from the shaft axis of the driver crank 410, at which time the ratio alternater is functioning at its minimum drive ratio.

A second ratio alternater second driver element slotted fork 420 is fixed to the rear end of the shaft 416 and rotates a second ratio alternater second driven element crank 422 fixed to a second ratio alternater output shaft 424 rotatably bearing supported by the housing 326.

A ratio alternater first-second speed driver gear 428 and neutral-first speed driver gear 430 are fixed to the shaft 424 and are in constant driving connection with, respectively, first-second speed transfer driver gear 432 and neutral-first speed transfer driver gear 434 rotatably carried on a fixed housing mounted shaft 436, both transfer driver gears 432 and 434 arranged for selective engagement with the driven gear 372. The driver gear 428 and transfer driver gear 432 are rotated through a reverse idler gear 438 rotatably carried on a housing mounted shaft 440 as seen in FIG. 7C to cause the transfer driver gear 432 to be driven in an opposite direction relative to the transfer driver gear 434.

In this series dual ratio alternater drive system, the first alternater components, consisting of the driver crank 398 and driven slot 400 elements previously described, function between first minimum and maximum ratio values relative to their driver and driven alternating radii ratios, which are proportional respectively to the direct and third speed gearings and also to the third and second speed gearings, to drive the third-direct speed and the second-third speed driver gears 402 and 408 between two positive rotational values. The second ratio alternater components, consisting of the linked driver element crank 410 and the driven element crank 414, augmented by the driver element slotted fork 420 and driven element function between second minimum and maximum ratio values relative to their driver and driven alternating radii ratios (taking into account the first ratio alternater values), which are proportional respectively to the second and first speed gearings and also to the first and neutral speed gearings to drive the oppositely rotating first-second speed transfer driver gear 432 and neutral-first speed transfer driver gear 434 between positive and substantially zero rotational values.

Thus, as the sleeve shaft 370 is selectively shifted on the reaction shaft 362 by the automatic mechanical shifter system 324 synchronously with the functions of the ratio alternater drive system 322, the following shift cycles are effected, the input shaft 336 driving in a clockwise direction as viewed from the left end of FIG. 7:

In the first shift action, the free but counterclockwise rotating driven gear 372 is selectively shifted into mesh with the transfer driver gear 434 at such time as their rotational velocities are substantially synchronized when the second ratio alternater is functioning substantially at the second minimum ratio value. In the second shift action or dwell, the transfer driver gear 434 is decelerated to drive the driven gear 372 to a substantially zero rotational velocity value. In the third shift action, the driven gear 372 is shifted out of mesh with the transfer driver gear 434 and simultaneously into engagement with the fixed element 388. The planetary gearing will thereby have been positively shifted with constant gear mesh, upon the deceleration of the reaction member 332 to zero, at which time it becomes a fixed member, from idle or neutral position to a first or low output speed drive condition.

In another first shift action, the driven gear 372 may next be selectively shifted into mesh with the counterclockwise rotating transfer driver gear 432 and simultaneously out of engagement with the fixed element 388 at such time as the transfer driver gear 432 has been driven to a substantially zero rotational value when the second ratio alternater is functioning substantially at the second maximum ratio value. During a second shift action or dwell, the transfer driver gear 432 is accelerated to drive the driven gear 372 clockwise with the planetary reaction member 332 toward its preset maximum speed. During a third shift action, the driven gear 372 is shifted out of mesh with the transfer driver gear 432 and substantially simultaneously into mesh with the second speed primary driver gear 382, their rotational values having become substantially synchronized when the second ratio alternater is functioning substantially at the second minimum ratio value. The planetary gearing will thereby have been positively driven, upon acceleration of the reaction member 332 and positive shifting to a predetermined constant speed value, from the first to a second output speed drive condition.

Similarly, in a further first shift action, the driven gear 372 may next be selectively shifted out of mesh with the primary driver gear 382 while the driven gear 374 is shifted into mesh with the second-third speed driver gear 408 at such time as their rotational values are substantially synchronized when the first ratio alternater is functioning at the first maximum ratio value. During a second shift action or dwell, the driver gear 408 is then accelerated to drive the driven gear 374 toward a maximum rotational value. Finally in a third shift action, the driven gear 374 is shifted out of mesh with the driver gear 408 and into mesh with the third speed primary driver gear 384, their rotational values having become substantially synchronized when the first ratio alternater is functioning substantially at the first minimum ratio value. The planetary gearing will thereby have been positively driven, upon further acceleration of the reaction member 332 to another predetermined value, from the second to a third output speed drive condition.

Finally, in another first shift action, the driven gear 374 may be selectively shifted out of mesh with the primary driver gear 384 while the driven gear 376 is shifted into mesh with the third-direct speed driver gear 402 at such time as their rotational velocities are substantially synchronized when the first ratio alternater is again functioning at the first maximum ratio value. During a second shift action or dwell, the driver gear 402 is accelerated to drive the driven gear 376 toward a maximum rotational value. Then during a third shift action the driven gear 376 is shifted out of mesh with the driver gear 402 while simultaneously the internal splines of the sleeve shaft 370 are shifted into engagement with the direct drive spline element 348, the rotational values of the input and reaction shafts 336 and 362 having become substantially synchronized when the first ratio alternater is functioning substantially at the first minimum ratio value. The planetary gearing will thereby have been positively driven, upon this final acceleration of the reaction member 332 to a direct drive rotation, from the third speed to a direct drive or high speed condition in which the planetary reaction member 332 is coupled with its input member 328. It will be apparent that proper selection of positive speed change gears will permit any number of intermediate output speeds to be designed into such a constant gear-mesh transmission system.

3. Automatic Mechanical Shifter System 324

The automatic mechanical shifter system 324 comprises a shifter driver disk 442 fixed to the rotating first ratio alternater input shaft 392, the disk 442 having an arcuate control guide segment 444, an offset return cam element 446, and two symetrically positioned driver lug elements 448 and 449 projecting from its face as shown in FIGS. 7, 7B, 7D and 7E.

Figure 7A:
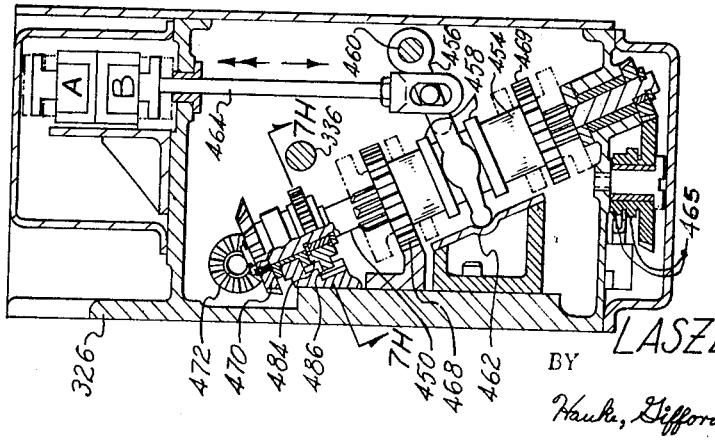
FIG. 7A is a cross-sectional view taken substantially on the line 7A—7A of FIG. 7.

An externally splined shifter shaft 450 rotatably bearing supported by the housing 326 has an internally splined shifter spool 454 axially slideable thereon from the neutral position shown in solid lines in FIGS. 7 and 7A selectively to either of the dotted line positions indicated, upon actuation of a shifter fork 456 engaged between a pair of spaced annular flanges 458. The shifter fork 456 is pivoted on a housing mounted pin 460 between the neutral position of FIG. 7A, where one fork arm is engaged in the detent of a locater leaf spring element 462, to shift the shifter spool 454 to either of the indicated dotted line angular positions, by an actuator rod 464 pivoted at one end as shown to the shifter fork 456 and selectively moved upon energizing of one or the other housing mounted solenoids A or B, which are energized by an appropriate electrical system (not shown) including switches actuated by cam elements 465 in a manner similar to the actuation by the cam elements 298 and 300 of the FIG. 6 embodiment. The other arm of the shifter fork 456 has a pair of spaced extending pin elements 466, seen in FIGS. 7 and 7D.

Each end of the shifter spool 454 is provided with a plurality of radially extending annularly spaced driven tooth elements 468 and 469, shown in FIGS. 7, 7A, 7D and 7E.

When the shifter fork 456 is in the neutral position, the pin elements 466 are both located within the circle circumscribed by the arcuate guide segment 444 and the tooth elements 468 and 469 of the shifter spool 454 are located in the phantom line positions of FIG. 7D where they will not be contacted by the driver lug elements 448 and 449. Thus the spool 454 and its splined shaft 450 will not be rotated.

An annularly toothed member 484 fixed to the shifter shaft 450 engages in the detent of a housing mounted leaf spring element 486 as shown in FIG. 7H to hold the shifter shaft 450 and a drivingly connected shifter drum 474 in each of its incrementally rotated positions to be hereafter described.

Upon selective actuation of, for example, solenoid A, the actuator rod 464 will actuate the shifter fork 456 in the direction of the single arrow shown in FIG. 7A, such that the outer fork pin element 466 will be cammed outside of the guide segment 444 thereby positively shifting the shifter spool 454 to mechanically positively locate the tooth elements 468 and 469 at the positions shown in solid lines in FIG. 7D as the shifter driver disk 442 rotates in the indicated counterclockwise direction, bringing the tooth element 468 into line with the driver lug element 448.

The lug element 448 will then rotate the shifter spool 454 for a predetermined angular rotation which begins before and ends after a 0° position of the ratio alternator for the first shift action designated in FIG. 7E during rotation of the shifter driver disk 442 through an arc designated in FIG. 7D. Then during rotation of the disk 442 through an arc designated SHIFT DWELL for the second shift action, the shifter spool 454 will be held in such first shifted position and will not rotate until the opposite driver lug element 449 engages the next driver tooth element 468 to start the third shift action, rotating another tooth 468 of the spool 454 for another predetermined angular rotation designated in FIG. 7D. Finally, the projecting cam portion of the return cam element 446 will engage the outermost position pin element 466 as the two pin elements 466 disengage from the guide segment 444, to cam them with the spool 454 back to the neutral position.

A bevel driver gear 470 is fixed to the shifter shaft 450 as shown in FIGS. 7 and 7A and is meshed at all times with a bevel driven gear 472 fixed to the shifter drum 474 rotatably bearing supported by the housing 326. A helical cam groove 478 on the shifter drum 474 is engaged with a cam assembly 480 carrying a ring member 482 encircling the splined sleeve shaft 370 which is rotatably mounted intermediate the driven gears 374 and 376 to produce the selective axial shiftings of the sleeve shaft 370 as the shifter drum 474 rotates.

Incremental first and third shift action rotations of the shifter spool 454 effect the necessary incremental rotations of the shifter drum 474 to produce the previously described shifts, and the non-rotating period produces the second shift actions or shift dwells, all cycled in permanent synchronized angular rotation with the functions of the ratio alternator drive system 322, because the primary drive system 320, ratio alternater drive system 322 and automatic mechanical positive shifter system 324 are all driven directly by the input shaft 336.

The automatic mechanical positive shifter system of FIG. 7 can be readily modified to suit any requirements of the transmission as regards shifting times or sequences, or to accommodate to additional speed shifts incorporated in such a transmission.

The electrical control system is not shown for this or further embodiments of the invention since in any system it can be readily designed to suit any requirements. Functionally it may be the same as or similar to that shown for the transmission of FIG. 6.

4. Driven Positive Stop Modifications

A modification of the structure of FIG. 7 is indicated in phantom lines therein, in which the primary shaft 378 is extended beyond the second speed primary driver gear 382 and has a positive stop driver gear 488 rotatably bearing supported on the shaft 378. A bevel reversing gear 492 fixed to a shaft 494 rotatably bearing supported by the housing 326 is meshed with bevel teeth 498 provided on the primary driver gear 382 and bevel teeth 500 provided on the positive stop driver gear 488 to rotate same reversely to the driver gears 382, 384 and 386 at that rotational value which will, when meshed with the neutral-first-second speed driven gear 372, positively drive the reaction member 332 at a speed and direction relative to the input member 328 to positively maintain the output member 330 at a zero rotational value, i.e. in a positive stopped position. Since all components are directly driven from the same input shaft 336, this method holds the output shaft 354 in its stopped position absolutely merely upon choosing the proper gear ratios. The driven gear 372 will be shifted into mesh with the positive stop driver gear 488 when their rotational velocities are substantially synchronized while the ratio alternater drive system 322 is functioning at substantially its minimum ratio value, in the manner previously described for the other synchronized shifts.

5. Alternative Ratio Functions

Figure 8:
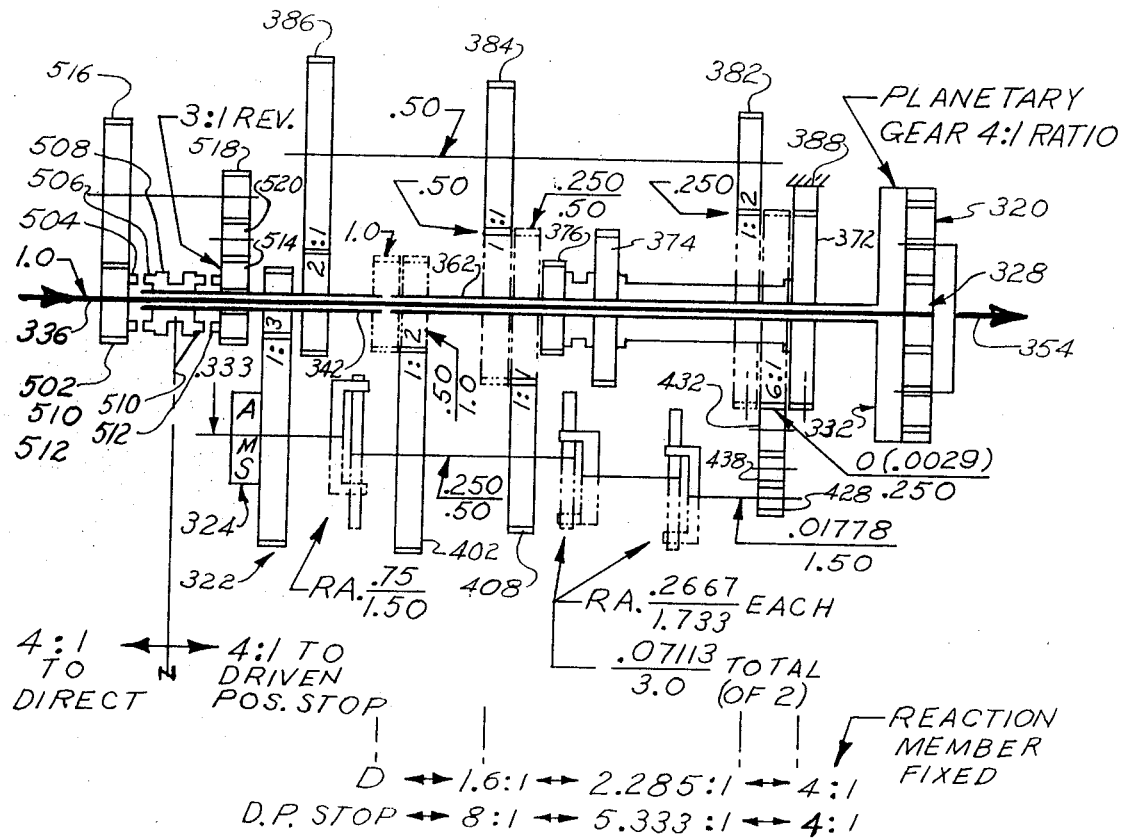
FIG. 8 is a diagrammatic longitudinal plan view illustrating substantially the system of FIG. 7, indicating exemplary relative ratio values of the drive system with the addition of a reversing disconnectable coupling system to illustrate possible alternative drive ratio functions, from low output speed to drive positive stop output.

FIG. 8 illustrates an arrangement of the transmission system of FIG. 7 in diagrammatic form with the addition of a reversing ratio system to illustrate how the present system can function to positively shift the planetary gearing into additional fixed ratios higher than its ratio when the reaction member is fixed, using the same ratio alternater and shifter systems and the same primary driver gears for both modes of operation. The numerical figures shown indicate how the functions of an exemplary system may be calculated.

In this arrangement, the input shaft 336 has a driver gear 502 fixed thereto and provided with driver coupler teeth 504 adapted for selective engagement with driven coupler teeth 506 provided on the forward side of a shiftable coupler member 508 adapted to be rotatable with and axially slideable on a forward extension of the drive element 342 which in this modification is rotatably carried on the input shaft 336. The rear end of the coupler member 508 has driven coupler teeth 510 selectively engageable with reverse driver coupler teeth 512 provided on a reverse driver gear 514 rotatably carried on the drive element 342. Reverser gears 516, 518 and 520, connected as shown with the driver gear 502 and reverse driver 514, function to rotate same from the input shaft 336 with a 3:1 reverse driving ratio. Thus, when the coupler teeth 504 and 506 are engaged, the drive element 342, from which are driven the driver gears 382, 384, 386, the ratio alternater system 322, and the automatic mechanical shifter system 324 rotates directly with the input shaft 336, but when the coupler teeth 510 and 512 are engaged, the drive element 342 and the components connected therewith are driven at a 3:1 ratio in a reverse direction.

The large fractional numbers shown in the diagram refer to rotational values of the indicated shafts and gears relative to a unit rotational value of the input shaft 336, and the two numbers associated with the driver and driven gears of the ratio alternater system 322 indicate their functional alternating maximum and minimum ratio values when the systems are driving in the "forward" direction. In the "reverse" direction, these rotational values and ratio values indicated must be multiplied by —0.333. All values are shown as exemplary only, producing only one referred set of functions. Other ratio values will produce different functions as desired.

In the "forward" direction operation, with the coupler teeth 504 and 506 engaged, and the reaction member 332 fixed by reason of the driven gear 372 being engaged with the fixed element 388, the planetary drive system will, for example, function at a 4:1 ratio. After the driven gear 372 is shifted for acceleration into mesh with the transfer driver gear 432 and then into mesh with the primary driver gear 382, the system will function at a 2.285:1 ratio. Next, after the driven gear 374 is shifted for acceleration into mesh with the driver gear 408 and then into mesh with the primary driver gear 384, the system will function at a 1.6:1 ratio. Finally, after the driven gear 376 is shifted for acceleration into mesh with the driver gear 402, following which then the drive element 342 and reaction shaft 362 are positively coupled through their splines, the system will function in direct drive or 1:1 ratio since the reaction member 332 is coupled directly with the input shaft 336.

On shifting down, the system will go through the same ratios, ending with the first speed 4:1 ratio when the reaction member 332 is fixed. At such time, the ratio alternater drive system and primary gears are operating under no load and the coupler member 508 can be shifted by any desired means to the right to engage the coupler teeth 510 and 512.

In this condition, the same shifts as above described will effect driving operation of the reaction member in the reverse rotational direction to effect, successively, a 5.333:1 ratio (second speed), an 8:1 (third speed), and finally when the reaction shaft 362 becomes connected to the drive element 342, to drive the reaction member 332 at 3:1 reverse ratio, which in the present illustration will effect a zero planetary output, the output shaft 354 being held in a driven positive stop condition, similar to that achieved in the FIG. 7 modification when the positive stop driver gear 488 is engaged with the driven gear 372.

In FIG. 8, the particular minimum and maximum ratio values of the ratio alternaters refer to their individual units and also to the driven gears when shifted into engagement, taking into account their drive ratios.

D. Planetary Ratio Alternater Systems

Figure 9:
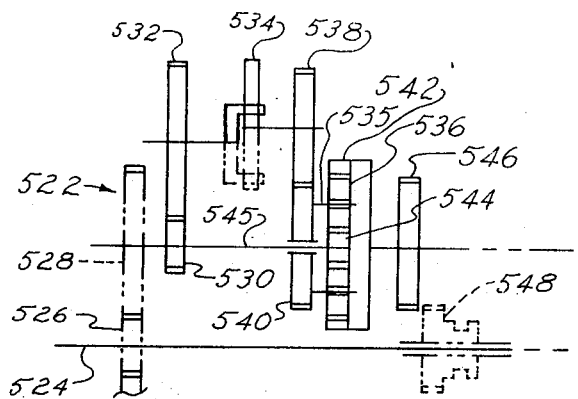
FIG. 9 is a diagrammatic longitudinal view illustrating one preferred planetary ratio alternater system.
Figures 10, 10A:
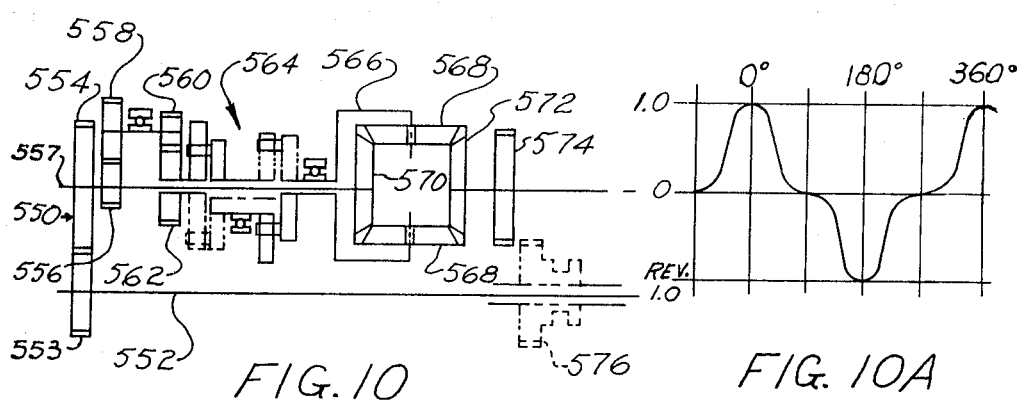
FIG. 10 is a diagrammatic longitudinal view illustrating another preferred planetary ratio alternater system.
FIG. 10A is a relative speed curve for the ratio alternater system of FIG. 10.

FIGS. 9 and 10 and their associated output speed diagrams illustrate novel ratio alternater systems which may be used to achieve selected minimum and maximum ratio values effecting accurate accelerations and decelerations of associated primary drive systems, whether of the planetary gear types disclosed in the present application, the spur gear types disclosed in my U.S. Pat. No. 3,468,177, or other types of positive continuous drive systems embodying my invention.

In FIG. 9 a ratio alternater system 522 is driven by an input shaft 524 through selected reduction gears 526, 528, to a planetary input shaft 545 and reduction gears 530 and 532. A crank-to-slot type ratio alternater 534 (which may be of any other suitable type) is operative to alternately accelerate and decelerate a reaction member (planet carrier 535 having planet gears 536) from a ratio alternater driver gear 538 and driven gear 540, between selected minimum and maximum planetary gearing ratio values, the maximum ratio value in the present arrangement being that which effects a substantially zero rotation of a planetary output member (ring gear 542) and the minimum ratio value being proportional to the direct drive ratio to alternate the ratio from one input member (sun gear 544), which is constantly driven from the planetary input shaft 545 as shown, to the output member (ring gear 542).

Figures 9A, 9B:
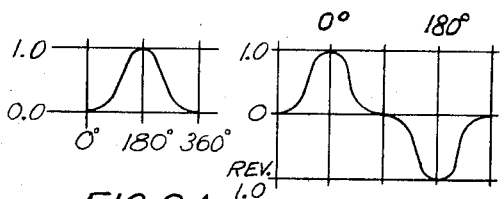
FIG. 9A is a relative speed curve for one mode of operation of the ratio alternater system of FIG. 9.
FIG. 9B is a relative speed curve for another mode of operation of the ratio alternater system of FIG. 9.

The output member (ring gear 542) thus alternately accelerates and decelerates a ratio alternater driver gear 546 fixed thereto between the required minimum and maximum ratio values (direct and substantially zero rotational values), so that at appropriate synchronized shift cycles it can be engaged with a driven gear 548. FIG. 9A is a speed curve which may be produced by the driven gear 548 illustrating for the present arrangement a variation between zero and unitary values relative to the input shaft 545. Other selected planetary gearing and ratio alternater ratio values may effect other selected minimum to maximum rotational values as desired.

By using other appropriately selected planetary gear and ratio alternater ratio values, the reaction member (planet carrier 535) may be driven to or closer to a zero rotational value, the ratio alternater maximum value effecting a reverse output member rotation with the type of planetary gearing shown in FIG. 9. This will produce both forward and reverse direction rotations of the output member as indicated by the speed curve diagram of FIG. 9B, but in such a case the reverse rotation will be at less than a 1:1 ratio.

FIG. 10 illustrates a bevel planetary ratio alternator system 550 driven from an input shaft 552. Reduction gears 553, 554, 556, driving a planetary input shaft 557 and reduction gears 558, 560 and 562, drive a dual crank-to-pin ratio alternater 564 which alternately accelerates and decelerates a reaction member (planet carrier 566 having bevel planet gears 568) between selected minimum and maximum rotational values. The reaction member planet gears 568 are meshed with an input member (bevel gear 570) and an output member (bevel gear 572). The maximum and minimum rotational values of the reaction member are respectively high and close to zero, to effect alternate forward and reverse rotational outputs of the output member bevel gear 572. If the bevel ears 570 and 572 are the same size, a substantially zero output rotation of the ratio alternater system 550 produces alternate forward and reverse one-to-one rotation of a ratio alternater driver gear 574 as indicated in the speed diagram of FIG. 10A. If the bevel gear 572 is of a different size than the bevel gear 570, and/or if the ratio alternater system varies between other than the above described minimum and maximum ratio values, then any other than a one-to-one reverse rotation of the driver gear 574 may be obtained.

The driver gear 574 is adapted to be selectively engaged with a driven gear 576 to produce speed changes of its associated drive system in the manner of the previously described planetary drive systems, of the spur gear drive systems of my aforementioned U.S. Pat. No. 3,468,177, or other drive systems.

E. Planetary Transmission with Speed Control Planetary

Figure 11:
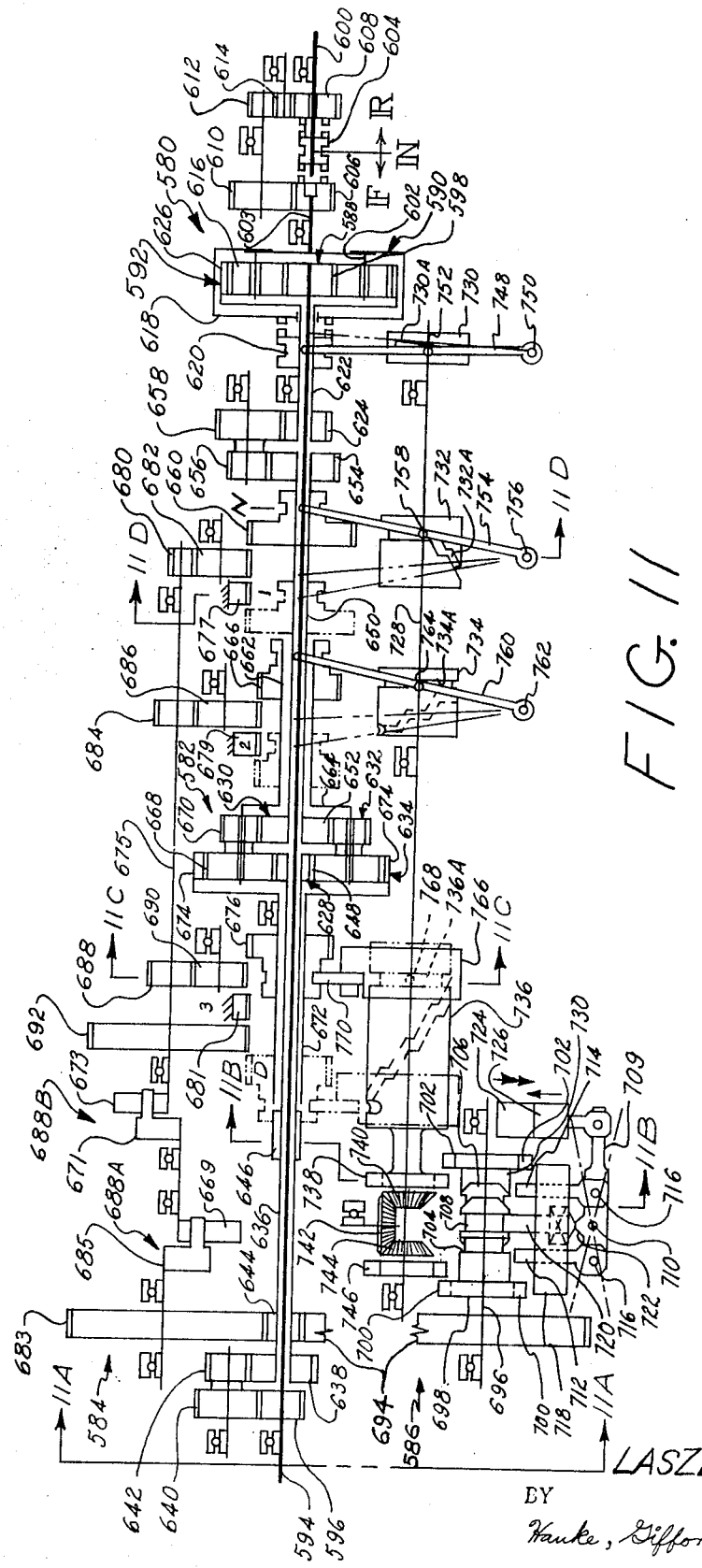
FIG. 11 is a diagrammatic longitudinal view illustrating a preferred planetary drive transmission having one output planetary and one speed change planetary embodying my invention.

A further planetary drive transmission system embodying my invention, as shown in FIG. 11, its associated cross-sections and diagrammatic views, uses one output planetary gearing for transmitting different predetermined constant and shifted speeds between its input and output shafts, with its reaction member driven by a speed control planetary gearing which is used to transmit constant drive speeds and shifted drive rotations to the output planetary reaction member through reduction gearing, to enable the speed control planetary drive to shift speeds at relatively lower rotational values than those at which the output planetary drive is operating.

This system basically comprises a primary drive system including an output planetary system 580 and a speed control planetary system 582, a ratio alternater drive system 584, and an automatic mechanical shifter system 586.

1. Primary Drive System — Output Planetary System 580

The output planetary system 580 includes an input member 588, an output member 590, and a reaction member 592.

The input member 588 comprises a sun gear 598 fixed for rotation with an input shaft 594 having a drive gear 596 fixed near the left end as seen in FIG. 11.

The output member 590 comprises a planet carrier 602 fixed for rotation with a planetary output shaft 603 connected with a transmission output shaft 600, either directly for forward "F" speed operation through a coupler member 604 when it is shifted to the left to engage positive coupling teeth on a gear 606 fixed to the planet carrier output shaft 603, or indirectly for reverse "R" speed operation when the coupler member 604 is shifted to the right to engage positive coupling teeth on a gear 608 driven from the gear 606 in reverse through reduction gears 610, 612 and 614. The coupler member 604 may also be shifted completely out of engagement to the neutral "N" position shown.

The planet carrier 602 has rotatable planet gears 616 in constant mesh with the sun gear 598 and is connected to a second carrier member 618 which is engageable with positive coupling teeth on a direct drive coupler member 620 to be described.

The reaction member 592 comprises a ring gear 626 fixed for rotation with a reaction shaft 622 having a driven gear 624 fixed on its forward end, the ring gear 626 being constantly meshed with the planet gears 616. The direct drive coupler member 620 is rotatable with and axially shiftable on the reaction shaft 622.

2. Primary Drive System — Speed Control Planetary System 582

The speed control planetary system 582 includes an input member 628, an output member 630, a first reaction member 632, and a second reaction member 634.

The input member 628 comprises an input sun gear 648 fixed for rotation with an input shaft 636 having also fixed to its forward end a driven gear 638 rotated through reduction gears 640 and 642 from the input shaft drive gear 596, a drive gear 644 fixed near the forward end, and a direct drive spline element 646 fixed in an intermediate position as shown.

The output member 630 comprises an output sun gear 652 fixed for rotation with an output shaft 650 having a driver gear 654 fixed to its rear end to rotate the output planetary system driven gear 624 through reduction gears 656 and 658, and a neutral-first speed driven gear 660 rotatable with and axially shiftable on the output shaft 650 between the solid and phantom line positions indicated. In effect, the output planetary reaction shaft 622 and the speed control planetary output shaft 650 constitute extensions of each other, the reaction shaft 622 being driven by the output shaft 650 at a higher selected speed by virtue of the gear train 654-656-658-624.

The first reaction member 632 comprises a planet carrier 664 fixed for rotation with a first reaction shaft 662 having a second speed driven gear 666 rotatable with and axially shiftable thereon between the solid and phantom line positions indicated. Planet gears 668 and 670 are co-rotatably mounted on the first reaction planet carrier 664 and are respectively constantly meshed with the input sun gear 648 and the output sun gear 652.

The second reaction member 634 comprises a ring gear 674 fixed for rotation with a second reaction shaft 672 having a third-direct speed driven gear 676 rotatable with and axially shiftable thereon between the solid and phantom line positions indicated, the ring gear 674 being constantly meshed with the planet gears 668.

First, second and third speed fixed members 677, 679, and 681 respectively are positioned for selective engagement with the neutral-first speed, second speed and third-direct speed driven gears 660, 666 and 676 respectively, in a manner to be hereafter described.

3. Ratio Alternater Drive System 584

The ratio alternater drive system 584 comprises a speed reduction gear 683 driven by the driver gear 644 fixed to the speed control planetary input shaft 636 and rotating a first driver element crank 685 of a first ratio alternater 688A. The crank 685 drives a first fork arm 669 rotatable on an axis offset from the axis of the crank 685 and in turn rotating a second driver element crank 671 of a second ratio alternater 688B. A second fork arm 673 driven by the crank 671 is fixed to and rotates a ratio alternater driver shaft 675 on an axis offset from the axis of the crank 671 with alternate acceleration and deceleration between selected maximum and minimum ratio values predetermined by the cumulative respective maximum and minimum ratio values of the ratio alternaters 688A and 688B, the maximum ratio being such as to effect a substantially zero rotational value of the driver shaft 675. The ratio alternaters may be of any type best suiting particular requirements and design.

A neutral-first speed driver gear 680 is fixed for rotation with the rear end of the driver shaft 675 and is in constant mesh with a rotatable neutral-first speed transfer driver gear 682 for selective engagement with the driven gear 660. A first-second speed driver gear 684 also fixed for rotation with the shaft 675 is in constant mesh with a rotatable first-second speed transfer driver gear 686 for selective engagement with the driven gear 666, and a second-third speed driver gear 688 fixed for rotation with the shaft 675 is in constant mesh with a rotatable second-third speed transfer driver gear 690 for selective engagement with the driven gear 676. Finally, a third-direct speed driver gear 692 is fixed for rotation near the forward end of the shaft 675 as shown for selective engagement also with the driven gear 676.

4. Automatic Mechanical Shifter System 586

The automatic mechanical shifter system 586 comprises a driver gear 694 positively driven from the input shaft 594 through reduction gears by the driver gear 644 on the speed control planetary input shaft 636, at the same ratio to the input shaft 594 as the ratio alternater speed reduction gear 683. The driver gear 694 rotates a shift cycle shaft 696 to which is splined for rotation therewith and axial shifting thereon a cycler spool 698 having on its opposite ends pairs of 180° separated shift actuator driver teeth 700 and 702. Cam grooves 704 and 706 are provided inwardly of the teeth 700 and 702 respectively and an annular groove 708 is provided centrally of the cycler spool 698, as shown. An actuator arm 709 pivoted on a pin 710 has actuator push rods 712 and 714 pivoted on pins 716 and extending through a fixed guide block 718 with their ends normally adjacent the cam grooves 704 and 706 respectively. A central neutral locater rod 720 carried by the guide block 718 is spring-loaded to be urged outwardly against a cam element 722 located on the actuator arm 709, but is normally held by such cam element 722 in engagement with the annular groove 708 in the cycler spool 698 to retain it in the neutral position shown.

The actuator arm 709 is selectively tilted in one direction or the other about the pin 710 by one or the other directional shift start solenoid 724 or 726 operatively linked to the actuator arm 709 as shown to move one of the actuator push rods 712 or 714 into engagement with one of the cam grooves 704 or 706 and to permit the neutral locator rod 720 to be urged out of the central annular groove 708, thereby initiating a shift cycle as will be described. The cam grooves 704 and 706 are arranged with 180° opposite functions so that the respectively engaged actuator push rod 712 or 714 moves the cycler spool 698 axially first to left or right, then holds it in such position for the completion of the mechanical shifting cycle, and finally cams it back to its neutral position before completing a 360° rotation, while an outwardly sloped bottom provided in the cam groove moves the push rod outwardly, automatically returning the actuator arm 709 to its neutral position while the cam element 722 moves the locator rod 720 back into the central annular groove 708, securing the cycler spool 698 again in its neutral position.

A rotatable shifter shaft 728 has fixed thereto a direct drive coupler shifter drum 730, a neutral-first speed shifter drum 732, a second speed shifter drum 734, and a third-direct drive shifter drum 736. An "up" shift cycle element 738 having eight driven shifter teeth thereon as seen in FIG. 11B is fixed for rotation with the forward end of the drum 736 and is engaged through bevel gears 740, 742 and 744 with a "down" shift cycle element 746 having shifter teeth similar to those of the element 738 and being rotatable on the shifter shaft 728.

When the actuator push rod 712 is moved to engage the cam groove 704, it shifts the rotating cycler spool 698 to the left, so that one of its two driver teeth 702 engages the teeth of the "down" shift cycle element 738 to first rotate the shifter shaft 728 and its drums 45° clockwise in a "down" speed shift direction for the first shift action, then provide a non-rotating dwell period for the second shift action, and finally rotate the shifter shaft 728 and its drums another 45° for the third shift action before the cycler spool 698 is returned to its neutral position, effecting a complete "down" speed shift cycle in constant relationship with the functions of the ratio alternater drive system 584.

When the actuator push rod 714 is moved to engage the cam groove 706, it shifts the rotating cycler spool 698 to the right, so that one of its two driver teeth 700 engages the teeth of the "up" speed shift cycle element 746 to first, through the bevel gear train 744-742-740, rotate the shifter shaft 728 and its drums 45° counterclockwise in an "up" shift direction for the first shift action, then provide a non-rotating dwell period for the second shift action, and finally rotate the shifter shaft 728 and its drums another 45° for the third shift action before the cycler spool 698 is returned to its neutral position, effecting a complete "up" speed shift cycle.

The shifter drums 730, 732, 734 and 736 are provided with stepped cam grooves 730A, 732A, 734A and 736A respectively, shown also on the cam drum development diagrams of FIG. 11E.

A direct drive shifter fork 748 pivoted on a pin 750 is engaged as at 752 in the cam groove 730A of the drum 730, in a manner similar to the structure shown in FIG. 11D, and has its upper end operatively connected in an annular groove in the direct drive coupler member 620 to synchronously selectively shift same into or out of positive driving engagement with the second carrier member 618.

A neutral-first speed shifter fork 754 pivoted on a pin 756 is engaged as at 758 in the cam groove 732A of the drum 732 and has its upper end operatively connected in an annular groove on the neutral-first speed driven gear 660 to synchronously selectively shift same between its neutral and first speed positions.

A second speed shifter fork 760 pivoted on a pin 762 is engaged as at 764 in the cam groove 734A of the drum 734 and has its upper end operatively connected in an annular groove on the second speed driven gear 666 to synchronously selectively shift same between its inoperative and second speed positions.

An annular sleeve 766 axially slidable on the third-direct drive shifter drum 736 is engaged as at 768 in the cam groove 736A and has a third-direct drive shifter fork 770 connected in an annular groove on the third-direct speed driven gear 676 to synchronously selectively shift same between its inoperative, third speed, and direct drive positions.

5. Operation

Only the "up" speed shift cycles will be described herein, the "down" speed shift cycles being substantially the reverse of the described functions.

It will be noted that since both the ratio alternater drive system 584 and the automatic mechanical shifter system 586 are driven with the same rotational value from the input shaft driver gear 644, the two systems will function in permanent synchronous relation. Also, since input to the two systems as well as to the speed control planetary system 582 is at a reduced speed relative to the input shaft 594, due to the down speed reduction gear train 596-640-642-638 on the input side and the up speed reduction gear train 654-656-658-624 on the output side, the ratio alternater functions and the shift cycles to be explained will be at reduced speeds while the output planetary system 580 is operating at the relatively higher input speeds.

In the position shown in FIG. 11, the output planetary reaction member 592 is rotating free, and counterclockwise relative to the clockwise input rotation, at a predetermined value determined by the planetary gearing ratio, while the output member 590 is in an idle or stopped condition at which time the coupler member 604 may be shifted manually or automatically by any suitable means from neutral "N" into either forward "F" or reverse "R."

To shift into first speed, the start solenoid 724 will be automatically energized by an up shift cycle start limit switch (not shown) actuated by the shift cycle shaft 696 and a suitable control circuit, which may be similar to that illustrated in FIG. 6E, to initiate a three step 90° counterclockwise rotation of the shifter shaft 728 and its connected shifter drums as previously described. The first 45° rotation of the shifter drum 732 effects a first shift action, as the shifter fork 754 follows a sloped cam groove portion (a) seen in FIG. 11E, meshing the rotating neutral-first speed driven gear 660 with the neutral-first speed transfer driver gear 682 at such time as their rotational values are substantially synchronized when the ratio alternater drive system 584 is functioning at its minimum ratio value. During a second shift action dwell, the shifter fork 754 being engaged in an annular cam groove portion (b) the driven gear 660 and the output planetary reaction member 592 rotating therewith are decelerated from counterclockwise rotation to substantially zero, at which time another 45° rotation of the cam drum 732 effects a third shift action, as the shifter fork 754 follows a sloped cam groove portion (c), disengaging the driven gear 660 from the transfer driver gear 682 and engaging it with the first speed fixed member 677 when the ratio alternater drive system 584 is functioning at its maximum ratio value (substantially zero rotation). As the reaction member 592 is slowed and stopped, the output member 590 will be accelerated to its first speed drive condition. Also, the speed control planetary output member 630 is also at zero, since it is connected to the reaction shaft 622 through the gear train 654-656-658-624, and hence the first reaction member 632 will be rotating free and counterclockwise at a predetermined value depending on the planetary gearing ratio.

To shift from first to second speed, the start solenoid 724 will again be energized to initiate a further "up" shift first, second and third shift action cycle. The first 45° rotation of the shifter drums 732 and 734 effects a first shift action of the shifter forks 754 and 760 respectively to the left, following sloped cam groove portions (d) and (e), simultaneously disengaging the driven gear 660 from the fixed member 677 and meshing the counterclockwise rotating second speed driven gear 666 with the first-second speed transfer driver gear 686 at such time as their rotational values are substantially synchronized when the ratio alternater drive system 584 is again functioning at its minimum ratio value. During a second shift action dwell, with the shifter fork 760 engaged in an annular cam groove portion (f), the driven gear 666 and the speed control planetary first reaction member 632 rotating therewith will be decelerated to substantially zero, at which time another 45° rotation of the shifter drum 734 effects a third shift action of the shifter fork 760 to the left, following a sloped cam groove portion (g), disengaging the driven gear 666 from the transfer driver gear 686 and engaging it with the second speed fixed member 679 when the ratio alternater drive system 584 is functioning at its maximum ratio value (zero rotation). As the first reaction member 632 is slowed and stopped, the output member 630 will be accelerated clockwise to drivingly accelerate the output member 590 of the output planetary system 580 to its second speed drive condition. Also, since the speed control planetary first reaction member 632 is at zero, the second reaction member 634 will be rotating free and counterclockwise at a predetermined value.

To shift from second to third speed, the start solenoid 724 will again be energized to initiate another first, second and third shift action cycle. The first 45° rotation of the shifter drums 734 and 736 effects a first shift action, with the shifter forks 760 and 770 respectively following sloped cam groove portions (h) and (i), simultaneously disengaging the driven gear 666 from the fixed member 679 and meshing the rotating third-direct speed driven gear 676 with the second-third speed transfer driver gear 690 at such time as their rotational values are substantially synchronized when the ratio alternater drive system 584 is again functioning at its minimum ratio value. During a second shift action dwell, with the shifter fork 770 engaged with an annular cam groove portion (j), the driven gear 676 and the speed control planetary second reaction member 634 rotating therewith are decelerated to substantially zero, at which time another 45° rotation of the shifter drum 736 effects a third shift action of the shifter fork 770, following a cam groove portion (k), disengaging the driven gear 676 from the transfer driver gear 690 and engaging it with the third speed fixed member 681 when the ratio alternater drive system is functioning at its maximum ratio value (zero rotation). As the second reaction member 634 is slowed and stopped, the output member 630 will be further positively accelerated to drivingly accelerate the reaction member 592 and therewith the output member 590 of the output planetary system 580 to its third speed drive condition.

Finally, to shift from third speed to direct drive, the start solenoid 724 is once more energized to initiate a final first, second and third shift action cycle. The first 45° rotation of the shifter drum 736 effects a first shift action of the shifter fork 770, following a cam groove portion (l), disengaging the driven gear 676 from the fixed member 681 and meshing it with the third-direct speed driver gear 692 at such time as it is at substantially zero rotational value when the ratio alternater drive system is functioning at its maximum ratio value (zero rotation). During a second shift action dwell, with the shifter fork 770 engaged in an annular cam groove portion (m), the driven gear 676 and the speed control panetary second reaction member 634 are accelerated to a predetermined clockwise rotational value. At this time another 45° rotation of the shifter drums 736 and 730 effects a third shift action of the shifter forks 770 and 748, respectively following the cam groove portions (n) and (o), disengaging the driven gear 676 from the driver gear 692 and simultaneously coupling the direct drive spline element 646 with the speed control planetary second reaction shaft 672 while substantially simultaneously coupling the output planetary reaction shaft direct drive coupler member 620 with the output member 590 at such time as their rotational values are substantially synchronized when the ratio alternater drive system 584 is again functioning at its minimum ratio value. As the second reaction member 634 is accelerated clockwise to its direct drive speed, the output member 630 will be accelerated to drivingly accelerate the output member 590 of the output planetary system 580 to that direct drive speed at which the described coupling shift can effect a coupled direct drive condition.

Shifting down from direct drive through third, second and first speed to neutral will be effected in similar complete shift cycles but with reverse shifting actions, as the start solenoid 726 is selectively energized by a down shift cycle start limit switch (not shown) to initiate the "down" shift cycles of the shifter shaft 728 in the clockwise rotational direction.

F. Geared Positive Clutch with Planetary Ratio Alternater

The present invention may be used in a planetary ratio alternater drive system which can be adapted to produce the alternating maximum and minimum ratios for positive shifting between different constant speeds of any primary drive system or between low speed and zero output, and FIG. 12 illustrates one type of planetary ratio alternater used in a geared positive clutch system to effect the constant acceleration and deceleration speed curves shown in FIG. 12A.

1. Primary Drive System 771

A primary drive system 771 comprises a rotatable input shaft 772 having fixed thereto an input drive gear 774, a planetary input member (sun gear 776), and a direct drive internal gear 778. A rotatable output shaft 780 has an output driven gear member 782 rotatable therewith and axially shiftable thereon, as indicated, between a positive stop (PS) position in which one gear 782A is meshed with a fixed member 802, and a direct drive (D) position in which another gear 782B is meshed with the direct drive internal gear 778 positively connecting the input shaft 772 with the output shaft 780.

2. Planetary Ratio Alternater Drive System 781

A planetary ratio alternater drive system 781 of this modification comprises an input driven gear 788 rotated by the input drive gear 774 and having a ratio alternater driver gear 790 integrally fixed therewith for constant gear mesh with a ratio alternater driven gear 792 driving a planetary reaction member (planet carrier 794). The ratio alternater elements may be of the gear type shown, or may be of any other variety as shown in my U.S. Pat. No. 3,468,177, or may be of the crank-link-crank type of the previously described systems, depending on requirements.

Planet gears 796 rotatable on the planet carrier 794 are constantly meshed with the sun gear 776 and with a planetary output member (internal ring gear 798) which is rotatable with a ratio alternater output driver internal gear 800. The relative ratio values of the driver and driven gears 790 and 792 are selected to effect continuous alternate acceleration and deceleration of the planet carrier 794 between the minimum ratio value required to produce the direct drive ratio and a maximum ratio value which is predetermined to effect a substantially zero output rotation of the ring gear 798, and the internal gear 800 rotating therewith.

3. Automatic Mechanical Positive Shifter System 784

The diagrammatically represented automatic positive shifter system 784 comprises a permanently synchronized selectively automatically cycled mechanism designated A.M.S. which is driven by a shift driver gear 786 in mesh with the input drive gear 774, and operates in synchronous relationship with the functions of the ratio alternater drive system to effect the necessary positive synchronous first, second and third shift actions of the output driven gear member 782 through a shifter arm 785.

4. Operation

In the position of FIG. 12, the output driven gear member has its gear 782A engaged with the fixed member 802 thereby holding the output shaft 780 in a positive stop condition. Upon selective actuation of the automatic mechanical shifter system 784 the output driven gear member 782 will be synchronously shifted in the first shift action to disengage the gear 782A from the fixed member 802 and to engage the gear 782B with the ratio alternater output driver internal gear 800 at such time as it is rotating at substantially zero value when the planetary ratio alternater drive system 781 is functioning at its maximum ratio value. During a second shift action dwell, the ratio alternater drive system 781 will drivingly accelerate the output driven gear member 782 with the output shaft 780 toward direct drive, at which time a further third shift action will disengage the gear 782B of the output driven gear member 782 from the ratio alternater output driver internal gear 800 and substantially simultaneously engage it with the direct drive internal gear 778 when the ratio alternater drive system 781 is functioning at its minimum ratio value, effecting a direct drive 1:1 ratio between the input and output shafts.

Selective shifting from direct (D) to positive stop (PS) is accomplished similarly with opposite functions as shown by the double-headed arrows in the diagram.

G. planetary Reverser Drive System

FIG. 13 illustrates an embodiment of the invention which will shift between forward and reverse rotational values, effecting a speed curve substantially like that diagrammed in FIG. 13A. Basically, the system shown comprises a primary drive system 804 of the single reverser planetary type, a planetary ratio alternater drive system 806, and a diagrammatically indicated automatic mechanical shifter system 808 (A.M.S.).

1. Primary Drive System 804

The primary drive system 804 comprises a rotatable input shaft 810 having fixed thereto an input drive gear 812, a direct drive internal gear 814, and a planetary input member sun gear 816 as shown. A planetary output member ring gear 820 is fixed to an output shaft 818, and a reaction member planet carrier 824 is fixed to a reaction shaft 822 and rotatably carries planet gears 826 continuously meshed with the sun and ring gears 816 and 820. A driven gear member 828 is rotatable with the reaction shaft 822 and axially shiftable thereon between the indicated forward (F) and reverse (R) positions upon selective synchronous shifting operations of the automatic mechanical shifter system 808.

In the full line position of FIG. 13, the driven gear member 828 is engaged with a fixed member 830 which may be a fixed internal gear, splined member or the like such that the output shaft 818 will be driven in reverse directional rotation from the input shaft 810 at a speed determined by the gear ratio of the planetary gearing. In the phantom line position of FIG. 13, the driven gear member 828 is engaged with the direct drive internal gear 814 for direct drive.

2. Planetary Ratio Alternater Drive System 806

The planetary ratio alternater drive system 806 is driven by the input drive gear 812 and comprises reduction gears 832, 834 and 836 rotating a ratio alternater driver gear 840 meshed with a ratio alternater driven gear 838.

A gear 844, rotating with the ratio alternater driven gear 838, drives a gear 846 with which is rotated a reaction member planet carrier 839 of the planetary ratio alternater, whose input member sun gear 841 rotates with the input shaft 810 and whose output member ring gear 843 rotates a ratio alternater output driver internal gear 848 which is selectively engageable with the driven gear member 828 as shown. The reaction member planet carrier 839 rotatably carries planet gears 842 which are in constant gear mesh with the sun gear 841 and ring gear 843.

The total minimum and maximum ratio values of the ratio alternater driver and driven gears 840 and 838 are selected to drivingly alternate the selected ratio value of the planetary ratio alternater to drive the ratio alternater driver internal gear 848 between final alternating minimum and maximum ratio values, which are such as will effect alternately a direct drive and a substantially zero rotation.

3. Automatic Mechanical Shifter System 808

The diagrammatically represented automatic mechanical shifter system 808 (A.M.S.) is driven by a driver gear 811 to shift the driven gear member 828 through a shifter arm 809, being permanently synchronized and selectively automatically cycled to effect the necessary first, second and third shift cycles, as indicated by single and double headed arrows, in synchronous relation to the functions of the ratio alternater drive system as previously described for other embodiments of the invention.

4. Operation

To shift the planetary system from reverse to forward, the driven gear member 828 is first shifted, by the first shift action, out of engagement with the fixed member 830 and substantially simultaneously into engagement with the ratio alternater driver internal gear 848 at such time as it is rotated at substantially zero when the ratio alternater system 806 is functioning at its maximum ratio value.

During a second shift action dwell period, the driven gear member 828 will be accelerated toward direct drive, at which time it is automatically synchronously engaged with the internal gear 814 by the third shift action, and is simultaneously disengaged from the ratio alternater driver internal gear 848, when the ratio alternater drive system 806 is functioning at its minimum ratio value.

Thus, during the aforementioned dwell period, the output shaft 818 will decelerate from the reverse drive speed to zero, than continuously accelerate in a forward direction to its direct drive (F) condition, effecting a speed curve like the left-hand half of FIG. 13A, the shifting actions indicated by the single headed arrows.

Shifting to reverse is accomplished through substantially opposite functions, indicated by the double headed arrows.

Since the speed curve tends to flatten out when the output shaft 818 decelerates toward zero and then starts to accelerate from zero, it would be possible at such time to apply appropriate ratio alternater and primary driver and driven gears to the reaction member of the primary drive system 804 which can be synchronously operated by the automatic mechanical shifter system 808 to produce a drive system having forward, stopped, and reverse drive positions. Such a drive system can readily be incorporated in any of the systems in which an output member is driven to a zero rotational value as shown in the embodiment of FIG. 14, and as has been shown and described in connection with my previously mentioned U.S. Pat. No. 3,468,177.

H. Bevel Planetary Reverser Drive System With Driven Positive Stop

FIG. 14 illustrates an embodiment of my invention in a bevel planetary reverser drive system which will operate to effect forward, stopped, and reverse drive but in which the reverse drive ratio value can be 1:−1, as indicated in the diagrammatic speed curve of FIG. 14A.

Basically, the system comprises a primary drive system 852, a ratio alternater drive system 854, and a diagrammatically indicated automatic mechanical shifter system 856 (A.M.S.).

1. Primary Drive System 852

The primary drive system 852 comprises an input shaft 858 having fixed thereto a driver gear 860, a direct drive splined element 862, and a planetary input member bevel gear 864. An output shaft 866 has fixed thereto a planetary output member bevel gear 868. A reaction member planet carrier 874 is fixed to a reaction shaft 870 which has a driven shifter member 872, provided with driven gears 871 and 873, the shifter member 872 being rotatable with and axially shiftable on the shaft 870 between the solid and phantom line positions shown. The reaction member planet carrier 874 rotatably supports planet bevel gears 876 which are constantly meshed with the input and output member bevel gears 864 and 868. It will be apparent that the planetary ratios may be varied simply by selecting any desired ratios or sizes of the input and output member bevel gears 864 and 868, but to effect a reverse 1:1 ratio they must be the same size.

The primary drive system 852 further comprises a rotatable primary driver shaft 878 having fixed thereto a primary driver gear 880 for selective engagement with the driven gear 871, and a drive gear 882 constantly meshed with the driver gear 860 which is fixed to the input shaft 858.

A fixed member 902 is arranged for selective engagement with the driven gear 873 as will be described.

2. Ratio Alternater Drive System 854

The ratio alternater drive system 854 comprises a ratio alternater driver gear 884 meshed with the input shaft driver gear 860 to operate a crank-to-fork type first ratio alternater 886 rotating a first ratio alternater output shaft 888 having a first ratio alternater driver gear 890 fixed thereto for selective engagement with the driven gear 871, and continuously alternating between a selected first minimum and maximum ratio values. A fork-to-crank type second ratio alternater 892, operated from the first ratio alternater output shaft 888, rotates a second ratio alternater output shaft 894 having fixed thereto a second ratio alternater driver gear 896 for selective engagement with the driven gear 873, and continuously alternating between selected second minimum and maximum ratio values such that the second maximum value functions to rotate the second ratio alternater driver gear 896 at a substantially zero value.

3. Automatic Mechanical Shifter System 856

The automatic mechanical shifter system 856 (A.M.S.) is driven by the drive gear 882 from the input shaft 858 to selectively positively synchronously shift the driven shifter member 872 to effect the necessary first, second and third shift cycles in synchronous relation to the functions of the ratio alternater elements as previously described.

4. Operation

The automatic mechanical shifter system 856 is shown diagrammatically and functions, as do the systems described in more detail heretofor, to synchronously shift the driven shifter member 872 to and from the full line direct or forward (F) drive condition shown, to and from an intermediate driven positive stop (DPS) condition, and to and from the phantom line reverse (R) drive condition.

In the forward drive position, the internal splines of the driven shifter member 872 couples the direct drive splined element 862 to the reaction shaft 870 to thereby drive the bevel planetary at the forward 1:1 (F) ratio value.

To shift to the driven positive stop position, a first shift action is initiated to disengage the driven shifter member 872 from the direct drive splined element 862 while meshing the driven gear 871 with the first ratio alternater driver gear 890 at such time as they are rotating with substantially synchronous velocity when the first ratio alternater 886 is functioning substantially at the first minimum ratio value. During a second shift action dwell period, the driven shifter member 872 and the reaction member planet carrier 874 will be decelerated toward a selected rotational value. Then a third shift action will disengage the first ratio alternater driver and driven gears 890 and 871 while meshing the driven gear 871 with the primary driver gear 880 at such time as they are rotating substantially synchronously, when the first ratio alternater 886 is functioning substantially at the first maximum ratio value, which is chosen to effect that rotation of the planet carrier 874 producing a zero rotational output of the output shaft 866 which, although the input member bevel gear 864 is rotating, will thus be drivingly maintained in an absolutely positive non-rotating condition.

To shift into reverse, as indicated by the single headed arrows, another first shift action disengages the driven gear 871 from the primary driver gear 880 and meshes the driven gear 873 of the driven shifter member 872 with the second ratio alternater driver gear 896 at such time as they are rotated substantially synchronously when the second ratio alternater 892 is functioning substantially at the second minimum ratio value. During a second shift action dwell period, the driven shifter member 872 and the reaction member planet carrier 874 rotated thereby will be decelerated to a substantially zero rotational value. Then a third shift action disengages the second ratio alternater driver gear 896 from the driven gear 873 and meshes the driven gear 873 with the fixed member 902 when the second ratio alternater 892 is functioning substantially at the second maximum ratio value which is selected to produce substantially zero rotation. With the planet bevel gears 876 now rotating on their fixed planet carrier 874, the output shaft 866 will rotate in reverse at a 1:−1 ratio value, providing the input and output member bevel gears 864 and 868 have the same diameter.

Shifting in the other direction, as indicated by the double headed arrows, from reverse to positive stop condition, and then to the forward drive condition, will similarly be effected upon appropriate opposite selective initiation of the proper shift cycles as shown by the second half speed curves of FIG. 14A.

As noted previously, depending on the selected sizes of the bevel gears, other than 1:1 (F) and 1:−1 (R) ratios may be achieved to produce a planetary output which will exhibit different speed curves than that shown in FIG. 14A. It will also be noted that by selecting different primary driver and driven gears 880 and 871, and an appropriately functioning ratio alternater system, other than a driven positive stop condition will result, which may be selected to be a second output forward or reverse drive speed. Elimination of the positive stop shift produces a system having forward and reverse shifting similar to the system of FIG. 13.

1. Two Speed Planetary Drive System with One-Way Brake

FIG. 15 illustrates an embodiment of my invention in a two speed triple planetary drive system to achieve two speed shifting with one shifter element, incorporating a one-way brake on one reaction member and having a constant gear-mesh shifting system applied to a second reaction member.

Basically, this embodiment comprises a primary drive system 904 having a triple planetary effecting a high reverse drive speed reduction, a ratio alternater drive system 906, and an automatic mechanical shifter system 908 (A.M.S.) providing reverse high (H) and low (L) speeds, both being lower than direct drive, with constant gear-mesh shifting.

1. Primary Drive System 904

The primary drive system 904 comprises a rotatable input shaft 910 having fixed thereto a bevel drive gear 912 and a planetary input member sun gear 914. An output shaft 916 has fixed thereto a planetary output member ring gear 918. A centrally located rotatable planet carrier 920 has rotatably mounted thereon first, second and third integrally connected planet gears 922, 924 and 926 respectively, the third planet gears 926 being in constant gear mesh with the planetary input member sun gear 914 and output member ring gear 918 as shown. A first reaction member ring gear 938 is meshed with the first planet gears 922 and is fixed to a first reaction shaft 934 which has a driven gear member 936 rotatable therewith and axially shiftable thereon between the full line and phantom line positions shown. A second planetary reaction ring gear 932 in constant mesh with the second planet gears 924 is fixed to a second reaction shaft 928 carried for unidirectional rotation by a one-way brake member 930.

2. Ratio Alternater Drive System 906

The ratio alternater drive system 906 comprises a ratio alternater input shaft 948 fixed for rotation by a worm gear 944 and driving a crank-to-fork type ratio alternater 950 to rotate a ratio alternater output shaft 952 at continuously accelerating and decelerating rotational values as the ratio alternater 950 functions between selected minimum and maximum ratio values. A bevel gear 940 meshed with the bevel drive gear 912 rotates a worm 942 drivingly meshed with the worm gear 944 for high reduction operation. A ratio alternater driver internal gear 954 is carried on a transfer driver gear 956 rotated from the ratio alternater output shaft 952 through intermediate reduction gears 958 and 960. The internal gear 954 and a fixed internal gear 962 are located for selective engagement with the driven gear member 936.

3. Automatic Mechanical Shifter System 908

The automatic mechanical shifter system 908 (A.M.S.) is indicated diagrammatically and only partially shown in FIG. 15B as being driven from the worm gear 944 for positive drive shift cycling, and it may be similar to the system of FIG. 7, being operably connected to a shifter fork 909 through a crank and link mechanism 911, operating synchronously with the functions of the ratio alternater drive system 906.

4. Operation

The shiftable driven gear member 936 is shown in FIG. 15 engaged with the fixed internal gear 962 for high speed (H) operation. In this position, the first reaction member ring gear 938 is stationary so that the planet gears 922 and 926 will transmit the rotation of the input member sun gear 914 to the output member ring gear 918 and output its shaft 916 in the higher speed to reverse, while the second planetary reaction ring gear 932 is rotating free as permitted by the one-way brake member 930.

To shift to low speed (L), a first action is selectively initiated by the automatic mechanical shifter system 908 to disengage the driven gear member 936 from the fixed internal gear 962 and mesh it with the ratio alternater driver internal gear 954 at such time as its rotational value is substantially zero when the ratio alternater drive system 906 is functioning substantially at its maximum ratio value. During a second shift action dwell period, the driven gear member 936 and the first reaction member ring gear 938 rotating therewith are accelerated to a selected rotational value, causing the second planetary reaction ring gear 932 to decelerate to zero rotational value. In the third shift action, the driven gear member 936 is disengaged from the ratio alternater driver internal gear 954 so that the first reaction member ring gear 938 is rotating free, while the second planetary reaction ring gear 932 and its reaction shaft 928 are decelerated to zero speed with their thrust directed against the one-way brake member 930 and thus are held in a fixed position, at such time as the ratio alternater drive system 906 is functioning at its minimum ratio value so that the planet gears 924 and 926 will transmit low speed drive from the input member sun gear 914 to the output shaft 916, thus producing the positive shifting portion of the speed curve diagrammed in FIG. 15A and indicated by a single headed arrow.

Operation of the system in reverse of the above described cycle effects a shift from low to high speed, producing the second portion of the speed curve diagrammed in FIG. 15A and indicated by a double headed arrow.

Although I have shown and described only a few exemplary systems in sub-sections A through I of the foregoing specification, it will be apparent that my invention provides the means for controlling the relative rotation of any reaction member or members in any and all types of planetary drive systems by positive gear-mesh shifting, to produce any desired planetary drive ratios or output speeds, and it will be apparent to one skilled in the art to which the invention pertains that various changes and modifications may be made therein without departing from the spirit of the invention as expressed in the appended claims.

What is claimed is:

1. A continuous drive motion change system for a primary drive system having an input means for driving an output means and a reaction means effecting operative connection of the input and output means, the input to output relative motions being determined by the motion of the reaction means relative to the input means, said motion change system comprising a motion alternater drive system and a shifter system, each system being independently drivingly connected with said input means at least during motion changes, wherein:

a. said motion alternater drive system comprises means driven between selected minimum and maximum motion values and selectively drivingly connected with said reaction means to vary the motion thereof between predetermined values for shifting from one output means motion to another; and b. said shifter system comprises means effecting selective operative connection of said reaction means with the driven means of said motion alternater drive system for changing the input to output means relative motion during predetermined functions thereof operatively synchronously related to said motion alternater drive system functions.

2. The system as in claim 1 in which said primary drive system includes a fixed member, and wherein:

a. the minimum motion value of the driven means of said motion alternater drive system is substantially zero and its maximum motion value is substantially synchronized with one predetermined motion value of said reaction means when said primary drive system is functioning at a first constant input to output relative motion;

b. said shifter system means is constructed and arranged to effect a complete shift cycle comprising a first shift action operably connecting said reaction means with said driven means when their motions are substantially synchronized while said driven means is functioning substantially at its maximum motion value, a second shift action dwell while said driven means decelerates said reaction means to substantially zero motion, and a third shift action disconnecting said reaction means from said driven means and simultaneously connecting said reaction means with said fixed member while said driven means is functioning substantially at its minimum motion value so that said primary drive system thereby functions at a second constant input to output relative motion; and c. said shifter system means is operable to effect a complete shift cycle in reverse of the foregoing actions.

3. The system as in claim 1 in which said primary drive system includes a primary driver means drivingly connected with said input means for constant relative motion therewith and selectively drivingly connected with said reaction means to effect a constant primary drive system input to output relative motion, wherein:

a. one motion value of the driven means of said motion alternater drive system is substantially synchronized with a first predetermined motion value of said reaction means, and the other motion value of said driven means is substantially synchronized with a second predetermined motion value of said reaction means when said primary drive system is functioning at its constant input to output relative motion;

b. said shifter system means is constructed and arranged to effect a complete shift cycle comprising a first shift action operably connecting said reaction means with said driven means when their motions are substantially synchronized while said driven means is functioning substantially at said one motion value, a second shift action dwell while said driven means changes said reaction means to its second motion value, and a third shift action disconnecting said reaction means from said driven means and simultaneously connecting said reaction means with said primary driver means when their motions are substantially synchronized while said driven means is functioning at its other motion value so that said primary drive system thereby functions at said constant input to output relative motion; and c. said shifter system means is operable to effect a complete shift cycle in reverse of the foregoing actions.

4. The system as in claim 3 in which said primary drive system includes a second primary driver means drivingly connected with said input means for constant relative motion therewith and selectively drivingly connected with said reaction means when same is functioning at said first predetermined motion value to drive said primary drive system at a second predetermined constant input to output relative motion.

5. The system as in claim 3 wherein said constant input to output relative motion is on the order of a one-to-one ratio.

6. The system as in claim 3 wherein said constant input to output relative motion is on the order of less than a one-to-one ratio.

7. The system as in claim 3 wherein said constant input to output relative motion is on the order of greater than a one-to-one ratio.

8. The system as in claim 1 in which said primary drive system includes a fixed member selectively connected with said reaction means to effect a first constant primary drive system input to output relative motion, and includes a primary driver means drivingly connected with said input means for constant relative motion therewith and selectively drivingly connected with said reaction means to effect a second constant primary drive system input to output relative motion, wherein:

a. the minimum motion value of said driven means is substantially zero and its maximum motion value is substantially synchronized with a predetermined motion value of said reaction means when said primary drive system is functioning at said second constant input to output relative value;

b. said shifter system means is constructed and arranged to effect a complete shift cycle comprising a first shift action operably connecting said reaction means with said driven means and simultaneously disconnecting said reaction means from said fixed member while said driven means is functioning substantially at its minimum motion value, a second shift action dwell while said driven means accelerates said reaction means toward said predetermined motion value, and a third shift action disconnecting said reaction means from said driven means and simultaneously connecting said reaction means with said primary driver means when their motions are substantially synchronized while said motion alternater drive system is functioning substantially at its maximum motion value so that said primary drive system thereby functions at said second constant input to output relative motion; and c. said shifter system means is operable to effect a complete shift cycle in reverse of the foregoing actions.

9. The system as in claim 8 wherein:

a. said shifter system means is constructed and arranged to effect another complete shift cycle comprising a first shift action the same as the first mentioned first shift action, a second shift action dwell while said motion alternater drive means accelerates said reaction means to a motion value effecting zero output motion of said primary drive system, and a third shift action disconnecting said reaction means from said motion alternater drive system means while same is functioning at its maximum motion value; and b. said shifter system means is operable to effect a complete shift cycle in reverse of the foregoing actions.

10. A positive continuously constant gear-mesh speed change system for a primary drive system having a planetary input member for driving a planetary output member and a planetary reaction member effecting operative connection of the input and output members, the input to output member relative ratios and output speeds being determined by the rotational value of said reaction member relative to the input member, said speed change system comprising a ratio alternater drive system and an automatic mechanical shifter system, each system being independently drivingly connected with said input member at least during speed changes, wherein:

a. said ratio alternater drive system comprises means driven alternately between selected minimum and maximum rotational values and selectively drivingly connected with said reaction member to vary the rotation thereof between predetermined values for shifting from one output speed to another; and b. said shifter system comprises means effecting selective operative connection of said reaction member with the driven means of said ratio alternater drive system for changing the input to output member relative ratio during predetermined functions thereof operatively synchronously related to said ratio alternater drive system functions.

11. The system as in claim 10 wherein said primary drive system includes means maintaining said reaction member in at least one of its predetermined values.

12. The speed change system of claim 10 wherein said shifter system is constructed and arranged to effect a complete shift cycle comprising:
   a. a first shift action synchronously connecting said reaction member when operating at one rotational value with the driven means of said ratio alternater drive system when same is functioning substantially at one of its rotational values;
   b. a second shift action dwell while said driven means drivingly accelerates or decelerates the reaction member to another rotational value; and
   c. a third shift action disconnecting said reaction member from said driven means when same is functioning substantially at its other rotational value.

13. The speed change system as in claim 10 wherein said ratio alternater drive system comprises:
   a. a rotatable input means rotating a driver element;
   b. a driven element rotated by said driver element with alternating substantially infinitely varying effective driving ratios between selected minimum and maximum ratio values relative to their alternating driving radii; and
   c. at least one driver means rotated with said driven element and selectively operably connected with and disconnected from said reaction member.

14. The speed change system as in claim 13 in which said reaction member rotates at a predetermined neutral rotational and directional value when said output member is at zero rotation, said primary drive system including a fixed member selectively connected with said reaction member to maintain same fixed at a zero rotational value whereby to effect a constant primary drive system input to output ratio, and wherein:
   a. said ratio alternater minimum ratio value is such as to rotate said ratio alternater driver means to a value substantially synchronous with said reaction member rotating at said predetermined neutral value, and said maximum ratio value is such as to rotate said ratio alternater driver means to a substantially zero rotational value;
   b. said shifter system when operating to shift from zero output member rotation to said constant ratio effects a complete shift cycle comprising
      a first shift action connecting said reaction member with said ratio alternater driver means while their rotational values are substantially synchronized when said ratio alternater system is functioning substantially at its minimum ratio value,
      a second shift action dwell while said ratio alternater drive system drivingly varies toward its maximum ratio value to positively drivingly decelerate said reaction member and thereby accelerate said output member, and
      a third shift action disconnecting said reaction member from said ratio alternater driver means and substantially simultaneously connecting said reaction member with said fixed member while the reaction member is rotated to substantially zero value when said ratio alternater system is functioning substantially at its maximum ratio value; and
   c. said shifter system when operating to shift from said constant drive ratio to zero output member rotation is operable to effect a complete shift cycle in reverse of the foregoing actions.

15. The speed change system as in claim 14, wherein:
   a. said primary drive system includes a primary driver means selectively connected with said reaction member when same is at its predetermined neutral rotational and directional value, and is rotated with said input means at a value which will positively rotate said reaction member at such value; and
   b. said shifter system effects said first shift action connection while substantially simultaneously disconnecting said reaction member from said primary driver means.

16. The speed change system as in claim 13 in which said primary drive system includes a fixed member selectively connected with said reaction member to maintain same fixed at a zero rotational value whereby to effect a constant primary drive system input to output ratio, and a direct drive member rotatable with said input member and selectively connected with said reaction member to rotate therewith effecting a one-to-one direct drive primary drive system input to output ratio, and wherein:
   a. said ratio alternater minimum and maximum ratio values are such as to alternately rotate said ratio alternater driver means substantially synchronously with said reaction member when same is alternatively selectively connected respectively with said direct drive member and with said fixed member;
   b. said shifter system when operating to shift from said constant drive ratio to said direct drive ratio effects a complete shift cycle comprising
      a first shift action disconnecting said reaction member from said fixed member and substantially simultaneously drivingly connecting said reaction member with said ratio alternater driver means while same is rotating at substantially zero value when said ratio alternater system is functioning substantially at its maximum ratio value,
      a second shift action dwell while said ratio alternater system drivingly varies toward its minimum ratio value to positively drivingly accelerate said reaction member, and
      a third shift action disconnecting said reaction member from said ratio alternater driver means and substantially simultaneously drivingly connecting said reaction member with said direct drive member while their rotational values are substantially synchronized when said ratio alternater system is functioning substantially at its minimum ratio value; and
   c. said shifter system when operating to shift from said direct drive ratio to said constant drive ratio is operable to effect a complete shift cycle in reverse of the foregoing actions.

17. The speed change system as in claim 13 in which said primary drive system includes a fixed member selectively connected with said reaction member to maintain same fixed at a zero rotational value whereby to effect a first constant primary drive system input to output ratio, and a primary driver means rotatable with said input member and selectively connected with said reaction member to maintain same at a predetermined rotational value whereby to effect a second constant primary drive system input to output ratio, and wherein:
   a. said ratio alternater minimum and maximum ratio values are such as to alternately rotate said ratio alternater driver means substantially synchronously with said reaction member when same is alternatively selectively connected with said primary driver means and with said fixed member;
   b. said shifter system when operating to shift from said first to said second constant drive ratio effects a complete shift cycle comprising
      a first shift action disconnecting said reaction member from said fixed member and substantially simultaneously drivingly connecting said reaction member with said ratio alternater driver means while same is rotating at substantially zero value when said ratio alternater system is functioning substantially at its maximum ratio value,
      a second shift action dwell while said ratio alternater system drivingly varies toward its minimum ratio value to positively drivingly accelerate said reaction member, and
      a third shift action disconnecting said reaction member from said ratio alternater driver means and substantially simultaneously drivingly connecting said reaction member with said primary driver means while their rotational values are substantially synchronized when said ratio alternater system is functioning substantially at its minimum ratio value; and c. said shifter system when operating to shift from said second to said first constant drive ratio is operable to effect a complete shift cycle in reverse of the foregoing actions.

18. The speed change system as in claim 13 in which said primary drive system includes a first and a second primary driver means rotatable with said input member and selectively alternatively connected with said reaction member to maintain same at respectively either of two predetermined rotational values whereby to effect respectively a first and a second constant primary drive system input to output ratio, and wherein:

a. said ratio alternater minimum and maximum ratio values are such as to alternately rotate said ratio alternater driver means substantially synchronously with said reaction member when same is alternatively selectively connected with said primary driver means;

b. said shifter system when operating to shift from said first to said second constant drive ratio effects a complete shift cycle comprising a first shift action disconnecting said reaction member from said first primary driver means and substantially simultaneously drivingly connecting said reaction member with said ratio alternater driver means while their rotational values are substantially synchronized when said ratio alternater system is functioning substantially at one of its ratio values, a second shift action dwell while said ratio alternater system drivingly varies toward its other ratio value, and a third shift action disconnecting said reaction member from said ratio alternater driver means and substantially simultaneously drivingly connecting said reaction member with said second primary driver means while their rotational values are substantially synchronized when said ratio alternater system is functioning substantially at its other ratio value; and c. said shifter system when operating to shift from said second to said first constant drive ratio is operable to effect a complete shift cycle in reverse of the foregoing actions.

19. The speed change system as in claim 13 in which said reaction member rotates at a predetermined neutral rotational and directional value when said output member is at zero rotation, said primary drive system including a primary driver means rotatable with said input member and selectively connected with said reaction member to maintain same at a predetermined rotational value whereby to effect a constant primary drive system input to output ratio, and wherein:

a. one of said ratio alternater ratio values is such as to rotate said ratio alternater driver means substantially synchronously with said reaction member rotating at said predetermined neutral value, and the other of said ratio values is such as to rotate said ratio alternater driver means substantially synchronously with said reaction member when same is selectively connected with said primary driver means;

b. said shifter system when operating to shift from neutral to said constant drive ratio effects a complete shift cycle comprising a first shift action connecting said reaction member with said ratio alternater driver means while their rotational values are substantially synchronized when said ratio alternater system is functioning substantially at one of its ratio values, a second shift action dwell while said ratio alternater system drivingly varies toward the other of its ratio values, and a third shift action disconnecting said reaction member from said ratio alternater driver means and substantially simultaneously connecting said reaction member with said primary driver means while their rotational values are substantially synchronized when said ratio alternater system is functioning substantially at its other ratio value; and c. said shifter system when operating to shift from said constant drive ratio to neutral is operable to effect a complete shift cycle in reverse of the foregoing actions.

20. The speed change system as in claim 13 in which said primary drive system includes a primary driver means rotatable with said input member and selectively connected with said reaction member to maintain same at a predetermined rotational value whereby to effect a constant primary drive system input to output ratio, and a direct drive member rotatable with said input member and selectively connected with said reaction member to rotate therewith effecting a one-to-one direct primary drive system input to output ratio, and wherein:

a. said ratio alternater ratio values are such as to alternately rotate said ratio alternater driver means substantially synchronously with said reaction member when same is alternatively selectively connected respectively with said primary driver means and with said direct drive member;

b. said shifter system when operating to shift from said constant drive ratio to said direct drive ratio effects a complete shift cycle comprising a first shift action disconnecting said reaction member from said primary driver means and substantially simultaneously drivingly connecting said reaction member with said ratio alternater driver means while their rotational values are substantially synchronized when said ratio alternater system is functioning substantially at one of its ratio values, a second shift action dwell while said ratio alternater system drivingly varies toward the other of its ratio values, and a third shift action disconnecting said reaction member from said ratio alternater driver means and substantially simultaneously drivingly connecting said reaction member with said direct drive member while their rotational values are substantially synchronized when said ratio alternater system is functioning substantially at its other ratio value; and c. said shifter system when operating to shift from said direct drive ratio to said constant drive ratio is operable to effect a complete shift cycle in reverse of the aforesaid actions.

21. The speed change system as in claim 10 and including at least a second planetary reaction member, said reaction members selectively alternatively effecting operative connection of the input and output members, the input to output member relative ratios and output speeds being determined by the rotational value of one or the other of said reaction members relative to the input member, wherein:

a. said ratio alternater drive system means driven alternately between selected minimum and maximum rotational values being selectively alternatively drivingly connected with said reaction members to vary the rotations thereof between predetermined values for shifting from one output speed to another; and b. said shifter system means effects selective operative alternative connections of one or the other of said reaction members with the driving means of said ratio alternater drive system for changing the input to output member relative ratio during predetermined functions thereof operatively synchronously related to said ratio alternater drive system functions.

22. The speed change system as in claim 21 in which the first mentioned reaction member rotates at a predetermined neutral rotational and directional value when the second reaction member is at zero rotation, said primary drive system including fixable means selectively connected with the second reaction member to maintain same fixed at a zero rotational value while the first mentioned reaction member is at its predetermined neutral rotational and directional value to effect a constant primary drive system input to output ratio, and wherein said shifter system includes means effecting selective connection of the first mentioned reaction member with the driving means of said ratio alternater drive system while the second reaction member is disengaging from said fixable means.

23. The speed change system as in claim 10 and including at least a second planetary drive system having a second planetary input member for driving a second planetary output member and a second planetary reaction member effecting operative connection of the second input and output members, the second input to output member relative ratios and output speeds being determined by the rotational value of said second reaction member relative to the second input member, and in which the output member of the first mentioned planetary drive system drives the second input member of said second planetary drive system, said speed change system including a second ratio alternater drive system associated with said second planetary drive system, wherein:
 a. said second ratio alternater drive system comprises means driven alternately between selected minimum and maximum rotational values and selectively drivingly connected with said second reaction member to vary the rotation thereof between predetermined values for shifting from one output speed to another; and
 b. said shifter system includes means effecting selective operative connection of said second reaction member with the driven means of said second ratio alternater drive system for changing the second input to output member relative ratios during predetermined functions thereof operatively synchronously related to the second ratio alternater drive system functions.

24. The speed change system as in claim 23 wherein each ratio alternater drive system comprises:
 a. a rotatable input means rotating a driver element;
 b. a driven element rotated by said driver element with alternating substantially infinitely varying effective driving ratios between selected minimum and maximum ratio values relative to their alternating driving radii; and
 c. at least one driver means rotated with said driven element and selectively operably connected with and disconnected from the reaction member of its associated planetary drive system.

25. The speed change system as in claim 24 including a direct drive member rotating with each input member and selectively connected with the associated reaction member whereby to effect a planetary direct drive ratio, and a fixed member selectively connected with each reaction member to maintain same fixed at a zero rotational value whereby to effect a constant low speed primary drive system input to output ratio, and wherein:
 a. said ratio alternater drive system minimum ratio values are such as to rotate each ratio alternater driver means to a value substantially synchronous with its associated reaction member rotating at its direct drive rotational value, and said maximum ratio values are such as to rotate each ratio alternater driver means to a substantially zero rotational value;
 b. said shifter system when operating to shift from each direct drive output member rotation to each constant ratio low speed effects a complete shift cycle comprising:
  a first shift action disconnecting a reaction member from its direct drive member and substantially simultaneously drivingly connecting such reaction member with its associated ratio alternater driver means while their rotational values are substantially synchronized when their associated ratio alternater system is functioning substantially at its minimum ratio value,
  a second shift action dwell while the associated ratio alternater drive system drivingly varies toward its maximum ratio value to positively drivingly decelerate its associated reaction member and thereby accelerate its associated output member, and
  a third shift action disconnecting the reaction member from its associated ratio alternater driver means and substantially simultaneously connecting said reaction member with its associated fixed member while the reaction member is rotated to substantially zero value when its associated ratio alternater system is functioning substantially at its maximum ratio value; and
 c. said shifter system when operating to shift from each constant drive ratio to each direct drive output member rotation is operable to effect a complete shift cycle in reverse of the aforesaid actions.

26. The speed change system as in claim 23 in which said primary drive system includes an input shaft having a positive clutch driver element, the first mentioned planetary drive system input member having a positive clutch driven element rotatable therewith, and a fixed member selectively connected with said first mentioned planetary drive system input member, and wherein:
 a. the ratio alternater drive system associated with said first mentioned planetary drive system has a driver means driven alternately between a zero and a predetermined rotational value synchronous with the rotational value of said clutch driver element and selectively drivingly connected with said first mentioned planetary drive system input member to vary the rotation thereof between respectively zero and a predetermined input value;
 b. said shifter system when operating to shift from zero input member rotation to a clutched condition effects a complete clutching shift cycle comprising
  a first shift action disconnecting said first mentioned planetary drive system input member from said fixed member and substantially simultaneously drivingly connecting said first mentioned planetary drive system input member with the first mentioned ratio alternater driver means while same is rotating at substantially zero value,
  a second shift action dwell while the first mentioned ratio alternater drive system drivingly varies its driver means toward its predetermined rotational value, and
  a third shift action disconnecting said first mentioned planetary drive system input member from the first mentioned ratio alternater driver means and substantially simultaneously connecting said positive clutch driver and driven elements while their rotational values are substantially synchronized; and
 c. said shifter system when operating to declutch and shift to zero input member rotation is operable to effect a complete shift cycle in reverse of the aforesaid actions.

27. A positive continuous constant gear-mesh speed change system for a primary drive system having a planetary input member for driving a planetary output member, and a planetary reaction member effecting operative connection of the input and output members, the input to output member relative ratios and output speeds being determined by the rotational value of said reaction member relative to the input member, said speed change system comprising a ratio alternater drive system having a first and a second ratio alternater each associated with operatively adjacent primary driver elements driven with said input member, and an automatic mechanical shifter system, said ratio alternater drive system and said shifter system both drivingly connected with said input member at least during speed changes, wherein:
 a. each ratio alternater includes means driven alternately between selected minimum and maximum rotational values and selectively drivingly connected with said reaction member to vary the rotation thereof between the predetermined values related to the rotational values of adjacently operative primary driver elements for shifting from one output speed to another; and
 b. said shifter system comprises means effecting selective operative alternative connection of said reaction member with the driven means of said ratio alternaters for changing the input to output member relative ratio during predetermined functions thereof operatively synchronously related to said ratio alternater functions.

28. The speed change system as in claim 27 wherein each ratio alternater comprises:
   a. a rotatable input means rotating a driver element;
   b. a driven element rotated by said driver element with alternating substantially infinitely varying effective driving ratios between selected minimum and maximum ratio values relative to their alternating driving radii; and
   c. at least one driver means rotated with said driven element and selectively operably connected with and disconnected from said reaction member.

29. The speed change system as in claim 28 in which said reaction member rotates at a predetermined neutral rotational and directional value when said output member is at zero rotation, said primary drive system including a fixed member selectively connected with said reaction member to maintain same fixed at a zero rotational value whereby to effect a constant primary drive system input to output ratio, and wherein:
   a. the first ratio alternater minimum ratio value is such as to rotate its driver means to a value substantially synchronous with said reaction member rotating at said predetermined neutral value, and its maximum ratio value is such as to rotate its driver means to a substantially zero rotational value;
   b. said shifter system when operating to shift from zero output member rotation to said constant drive ratio effects a complete shift cycle comprising
      a first shift action connecting said reaction member with said first ratio alternater driver means while their rotational values are substantially synchronized when said first ratio alternater is functioning substantially at its minimum ratio value,
      a second shift action dwell while said first ratio alternater drivingly varies toward its maximum ratio value to positively drivingly decelerate said reaction member and thereby accelerate said output member, and
      a third shift action disconnecting said reaction member from said first ratio alternater driver means and substantially simultaneously connecting said reaction member with said fixed member while the reaction member is rotated to substantially zero value when said first ratio alternater is functioning substantially at its maximum ratio value; and
   c. said shifter system when operating to shift from said constant drive ratio to zero output member rotation is operable to effect a complete shift cycle in reverse of the aforesaid actions.

30. The speed change system as in claim 29, wherein:
   a. said primary drive system includes a primary driver means selectively connected with said reaction member when same is at its predetermined neutral rotational and directional value, and is rotated with said input means at a value which will positively rotate said reaction member at such value; and
   b. said shifter system effects said first shift action connection while substantially simultaneously disconnecting said reaction member from said primary driver means.

31. The speed change system as in claim 28 in which said primary drive system includes a fixed member selectively connected with said reaction member to maintain same fixed at a zero rotational value whereby to effect a first constant primary drive system input to output ratio, and a primary driver means rotatable with said input member and selectively connected with said reaction member to maintain same at a predetermined rotational value whereby to effect a second constant primary drive system input to output ratio, and wherein:
   a. said first ratio alternater minimum and maximum ratio values are such as to alternately rotate its associated driver means substantially synchronously with said reaction member when same is alternatively selectively connected with said primary driver means and with said fixed member;
   b. said shifter system when operating to shift from said first to said second constant drive ratio effects a complete shift cycle comprising
      a first shift action disconnecting said reaction member from said fixed members and substantially simultaneously drivingly connecting said reaction member with said first ratio alternater driver means while same is rotating at substantially zero value when said first ratio alternater is functioning substantially at its maximum ratio value,
      a second shift action dwell while said first ratio alternater drivingly varies toward its minimum ratio value to positively drivingly accelerate said reaction member, and
      a third shift action disconnecting said reaction member from said first ratio alternater driver means and substantially simultaneously drivingly connecting said reaction member with said primary driver means while their rotational values are substantially synchronized when said first ratio alternater is functioning substantially at its minimum ratio value; and
   c. said shifter system when operating to shift from said second to said first constant drive ratio is operable to effect a complete shift cycle in reverse of the foregoing actions.

32. The speed change system as in claim 31 in which said primary drive system includes a second primary driver means rotatable with said input member and selectively connected with said reaction member to maintain same at another predetermined rotational value whereby to effect a third constant drive input to output ratio, and wherein:
   a. said second ratio alternater minimum and maximum ratio values are such as to alternately rotate its associated driver means substantially synchronously with said reaction member when same is alternatively selectively connected with said primary driver means;
   b. said shifter system when operating to shift from said second to said third constant drive ratio effects a complete shift cycle comprising
      a first shift action disconnecting said reaction member from said first primary driver means and substantially simultaneously drivingly connecting said reaction member with said second ratio alternater driver means while their rotational values are substantially synchronized when said second ratio alternater system is functioning substantially at one of its ratio values,
      a second shift action dwell while said second ratio alternater system drivingly varies towards its other ratio value, and
      a third shift action disconnecting said reaction member from said second ratio alternater driver means and substantially simultaneously drivingly connecting said reaction member with said second primary driver means while their rotational values are substantially synchronized when said second ratio alternater system is functioning substantially at its other ratio value; and
   c. said shifter system when operating to shift from said third to said second constant drive ratio is operable to effect a complete shift cycle in reverse of the foregoing actions.

33. The speed change system as in claim 32 in which said primary drive system includes a direct drive member rotatable with said input member and selectively connected with said reaction member to rotate therewith effecting a one-to-one direct primary drive system input to output ratio, and wherein:
   a. said second ratio alternater ratio values are such as to alternately rotate its associated driver means substantially synchronously with said reaction member when same is alternatively selectively connected respectively with said second primary driver means and with said direct drive member;
   b. said automatic mechanical shifter system when operating to shift from said third constant drive ratio to said direct drive ratio effects a complete shift cycle comprising
      a first shift action disconnecting said reaction member from said second primary driver means and substantially simultaneously drivingly connecting said reaction member with said second ratio alternater driver means while their rotational values are substantially synchronized when said second ratio alternater is functioning substantially at said other ratio value;

a second shift action dwell while said second ratio alternater drivingly varies toward said one of its ratio value, and a third shift action disconnecting said reaction member from said second ratio alternater driver means and substantially simultaneously drivingly connecting said reaction member with said direct drive member while their rotational values are substantially synchronized when said second ratio alternater is functioning substantially at said one of its ratio values; and c. said shifter system when operating to shift from said direct drive ratio to said third constant drive ratio is operable to effect a complete shift cycle in reverse of the aforesaid actions.

34. The speed change system as in claim 27 and including a reverse drive coupling means operable to drive said primary drive system, said ratio alternater drive system and said shifter system selectively in either rotative direction whereby to effect different planetary driving ratios depending on which direction the primary drive, ratio alternater and shifter systems are driven.

35. The speed change system as in claim 10 and including means operable to selectively disconnect said ratio alternater drive system and said automatic mechanical shifter system from said input member.

36. A positive continuously constant gear-mesh speed change system for a primary drive system having a primary planetary input member for driving a primary planetary output member and a primary planetary reaction member effecting operative connection of the primary input and output members, the primary input to output member relative ratios and output speed being determined by the rotational value of said primary reaction member relative to the primary input member, said speed change system comprising a speed change planetary drive system, a ratio alternater drive system and an automatic mechanical shifter system, all drivingly connected with said input member at least during speed changes, wherein:

a. said speed change planetary drive system comprises a speed change planetary input member for driving a speed change planetary output member and at least one speed change planetary reaction member effecting operative connection of the speed change input and output members, the speed change input to output member relative ratios and output speed being determined by the rotational value of said speed change reaction member relative to the speed change input member, the speed change output member being drivingly connected with the primary reaction member, b. said ratio alternater drive system comprises means driven alternatively between selected minimum and maximum rotational values and selectively drivingly connected with the speed change reaction member to vary the rotation thereof between predetermined values for shifting from one output speed to another; and c. said shifter system comprises means effecting selective operative connections of said speed change reaction member with the driven means of said ratio alternater drive system for changing the speed change input to output member relative ratio during predetermined functions thereof operatively synchronously related to said ratio alternater drive system functions.

37. The speed change system as in claim 36 wherein said speed change planetary drive system, said ratio alternater drive system, and said shifter system are driven together at a different relative speed than said primary drive system.

38. The speed change system as in claim 36 including means selectively drivingly coupling and uncoupling two primary planetary members for direct drive thereof.

39. The speed change system as in claim 36 and including a first gear means drivingly connecting the primary input member with the speed change input member, the ratio alternater drive system and the shifter system, and a second gearing means drivingly connecting the speed change output member with said primary reaction member, said first and second gear means being constructed and arranged to drive the speed change planetary drive system, the ratio alternater drive system and the shifter system at a lower speed than said primary drive system, and to proportionally drive said primary reaction member from said speed change output member at a respectively higher speed than said speed change planetary drive system.

40. The speed change system as in claim 10 wherein said shifter system means comprises:

a. driver means rotated with said input member;

b. shifter means operably connected with said reaction member to shift same into and out of operative connection with the driven means of said ratio alternater;

c. actuator means operable to transmit predetermined rotational cycles of said driver means to said shifter means in synchronization with said ratio alternater drive system functions;

d. shift cycler means connecting and operating said actuator means from said driver means for selective cycles determining whether said shifter system operates to shift from lower to higher or from higher to lower relative ratios and output speeds; and e. shift cycle start means driven with said input member and selectively operable to initiate operations of said shift cycler means at predetermined points in said ratio alternater drive system functions.

41. The speed change system as in claim 40 wherein:

a. said driver means comprises two oppositely rotated driver gear elements;

b. said shifter means comprises a shifter arm element operably connected between said reaction member and said actuator means;

c. said actuator means comprises a cam drum having cam grooves engaged with said shifter arm element for operating same to transfer camming movements into reaction member shift movements;

d. said shift cycler means comprises a shifter member alternatively engageable with said driver gear elements for alternative cycled positive driving engagement therewith and operatively connected to rotate said cam drum for selected shift cycles in one or the other direction, and having an intermediate position disengaged from said driver gear elements upon completion of a shift cycle; and e. said shift cycle start means includes means sensing preset positions of said shifter member and said driver gear elements to synchronize operations thereof with said ratio alternater drive system functions.

42. The speed change system as in claim 40 wherein:

a. said driver means comprises a disk provided with projecting driver elements;

b. said shifter means comprises a shifter arm element operably connected between said reaction member and said actuator means;

c. said actuator means comprises a cam drum having cam grooves engaged with said shifter arm element for operating same to transfer camming movements into reaction member shift movements;

d. said shift cycler means comprises a shifter member alternatively engageable with the driver elements on diametrically opposite sides of said disk for alternative cycled positive driving engagement therewith and operatively connected to rotate said cam drum for selected shift cycles in one or the other direction, and having an intermediate position disengaged from said driver elements upon completion of a shift cycle; and e. said shift cycle start means includes means sensing preset positions of said shifter member and said driver elements to synchronize operations thereof with said ratio alternater drive system functions.

43. The speed change system as in claim 40 wherein:
a. said driver means comprises two similarly rotated driver gear elements;
b. said shifter means comprises a shifter arm element operably connected between said reaction member and said actuator means;
c. said actuator means comprises a cam drum having cam grooves engaged with said shifter arm element for operating same to transfer camming movements into reaction member shift movements; and
d. said shift cycler means comprises a shifter member rotatable with said driver gear elements, two driven gear elements respectively connected for alternative rotation of said cam drum in opposite directions and selectively respectively alternatively engageable with said driver gear elements, and means actuating said shifter member for selective alternative cycled engagement of said driver and driven gear elements to rotate said cam drum for selected shift cycles in one or the other direction, and having an intermediate position disengaging said driver and driven gear elements upon completion of a shift cycle.

44. The speed change system as in claim 13 wherein:
a. said input means comprises a driver shaft rotatably driven with said input member;
b. said driver element comprises a radially slotted arm rotated with said driver shaft; and
c. said driven element comprises a crank arm rotatable on an axis offset from the axis of said first slotted arm and radially variably drivingly engaged therewith to thereby alternately vary their relative driver to driven radii.

45. The speed change system as in claim 13 wherein:
a. said input means comprises a driver shaft rotatably driven with said input member;
b. said driver element comprises a first crank arm rotated with and at a fixed radius from said driver shaft;
c. said driven element comprises a second crank arm rotatable at a fixed radius on an axis offset from the axis of said first crank arm; and
d. a link member connecting said crank arms to drive said second crank arm from said first crank arm at alternately varying relative driver to driven radii.

46. The speed change system as in claim 13 wherein:
a. said input means comprises a driver shaft rotatably driven with said input member;
b. said driver element comprises a first crank arm rotated with and at a fixed radius from said driver shaft;
c. said driven element comprises a radially slotted arm rotatable on an axis offset from the axis of said first crank arm and radially variably drivingly engaged therewith to thereby alternately vary their relative driver to driven radii.

47. The speed change system as in claim 10 wherein said ratio alternater drive system comprises:
a. a rotatable input means;
b. a first ratio alternater comprising a first driver element rotated with said input means,
a first driven element rotated by said first driver element with alternating substantially infinitely varying effective driving ratios between selected minimum and maximum ratio values relative to their alternating driving radii;
c. an intermediate connector means rotated with said first driven element on the axis thereof;
d. a second ratio alternater comprising
a second driver element rotated with said intermediate connector means,
a second driven element rotated by said second driver element with alternating substantially infinitely varying effective driving ratios between selected minimum and maximum ratio values relative to their alternating driving radii; and
e. at least one driver means rotated with said second driven element and selectively operably connected with and disconnected from said reaction member.

* * * * *